United States Patent
Zellweger et al.

(10) Patent No.: US 7,120,622 B2
(45) Date of Patent: Oct. 10, 2006

(54) AUTHORING TOOLS, INCLUDING CONTENT-DRIVEN TREETABLES, FOR FLUID TEXT

(75) Inventors: Polle Trescott Zellweger, Palo Alto, CA (US); Paula S. Newman, Los Altos, CA (US); Maribeth J. Back, San Francisco, CA (US)

(73) Assignee: Xerox Corporation, Stamford, CT (US)

( * ) Notice: Subject to any disclaimer, the term of this patent is extended or adjusted under 35 U.S.C. 154(b) by 500 days.

(21) Appl. No.: 10/164,587

(22) Filed: Jun. 10, 2002

(65) Prior Publication Data

US 2003/0229607 A1    Dec. 11, 2003

(51) Int. Cl.
*G06F 17/30* (2006.01)
(52) U.S. Cl. .................. 707/1; 707/100; 707/104.1; 715/514; 715/713
(58) Field of Classification Search ............. 707/1–10, 707/100–104.1, 200–206; 715/500–540, 715/700–865; 709/217–219
See application file for complete search history.

(56) References Cited

U.S. PATENT DOCUMENTS

| | | | | |
|---|---|---|---|---|
| 5,870,552 | A | * | 2/1999 | Dozier et al. ............ 709/219 |
| 6,085,202 | A | * | 7/2000 | Rao et al. .................. 715/509 |
| 6,185,582 | B1 | * | 2/2001 | Zellweger et al. .......... 715/503 |
| 6,230,170 | B1 | | 5/2001 | Zellweger ................. 715/512 |
| 6,243,700 | B1 | * | 6/2001 | Zellweger .................... 707/3 |
| 6,256,649 | B1 | * | 7/2001 | Mackinlay et al. ......... 715/503 |
| 6,385,619 | B1 | | 5/2002 | Eichstaedt ............... 707/104.1 |

OTHER PUBLICATIONS

Chamberlin, D.D. et al., an extensible system for editing documents of mixed type, IEEE, 317-326.*
Jourdan, M. et al., Multiviews interfaces for multimedia authoring environments, IEEE, 72-79.*
Liechti, O., et al. "The SGF Metadata Framework and its Support for Social Awareness on the World Wide Web", *World Wide Web*, vol. 2, No. 4, pp. 191-208 (1999).
O. Liechti, et al., "Structured Graph Format: XML metadata for describing Web site structure". *Computer Networks and ISDN Systems*, vol. 30, Nos. 1-7, pp. 11-21 (1998).
O. Liechti, et al., "The SGF Metadata Framework and its Support for Social Awareness on the World Wide Web", *World Wide Web*, vol. 2, No. 4, pp. 1-29 (1999).
M. Sifer et al., "Zooming in One Dimension can be better than Two: an Interface for Placing Search Results in Context with a Restricted Sitemap", IEEE Symposium on visual Languages (VL'99), Sep. 13-16, 1999, 8 pages.
U.S. Appl. No. 09/098,942 filed Jun. 17, 1998.
U.S. Appl. No. 09/794,100 filed Feb. 28, 2001.
U.S. Appl. No. 09/954,388 filed Sep. 10, 2001.
U.S. Appl. No. 09/954,530 filed Sep. 10, 2001.

* cited by examiner

*Primary Examiner*—Shahid Alam
*Assistant Examiner*—Jean Bolte Fleurantin
(74) *Attorney, Agent, or Firm*—Oliff & Berridge, PLC

(57) ABSTRACT

Plural versions of an authoring/editing tool for fluid text include both a WYSIWYG editor and a content-driven treetable editor for producing narratives and their behavioral control in a fluid text viewing system environment. The tool includes content-driven treetable visualization and layout mechanisms for authoring and/or editing hypertext narratives, electronic mail threads and other tree-oriented applications. Edit operations are disclosed that permit interactive development and modification of treetables.

24 Claims, 25 Drawing Sheets

FIG. 3

Harry the Ape

*O*nce upon a time there was a Universe dark and big with only a sugar dusting of stars spread unevenly through the bleakness. Around one lonesome star a handful of planets, circled in an endless, elliptical dance. On one of these planets there was a jungle, lush and green, filled with all manner of plant and animal. One of these animals was Harry the Ape whose long red fur fluttered in the wind and gleamed in the morning sun. Harry was such a big ape that he didn't notice that on his foot lived a small brown, blue-eyed mouse, buried in his big toe's fur. The Mouse's name was Mary and Mary lived by eating the food that Harry dropped. Mary particularly loved the banana peels which often feel like slimy, stringy rain. In Mary's brown fur there lived a small, quiet, spider by the name of Sam. Sam loved to eat the lice that lived in Mary's fur. Munch, munch, munch. In Sam the Spider's stomach lived an amoebae named Anne along with her whole squirmy family. The amoebas lived on small portions of the lice that Sam ate. Anne the Amoebae had never met Harry the Ape, but wherever Harry went, Anne went too. And they all spun around in the Universe, which was dark and very, very big.

FIG. 4

Harry the Ape $O_{nce}$ well, really not just once, but a thousand times, no a million times, no, an infinite numbers of times, there were Universes formed not so different from this Universe. For instance, there was one Universe where instead of having white sparkling stars there were big colorful jelly beans in the sky at night.

Around one lonesome star a handful of planets, circled in an endless, elliptical dance. On one of these planets there was a jungle, lush and green, filled with all manner of plant and animal. One of these animals was Harry the Ape, whose long red fur fluttered in the wind and gleamed in the morning sun. Harry was such a big ape that he didn't notice that on his foot lived a small brown, blue-eyed mouse, buried in his big toe's fur. The Mouse's name was Mary and Mary lived by eating the food that Harry dropped. Mary particularly

Harry the Ape $O_{nce\ upon}$ a time there was an alternative Universe filled with colorful stars. Each star was famous for a different kind of music which it boomed out across the cosmos. It was called "The Big Party Universe" by those in the know, because all the creatures, big and small, danced all the time.

Around one lonesome star a handful of planets, circled in an endless, elliptical dance. On

Harry the Ape

Once well, really not just once, but a thousand times, no a million times, no, an infinite numbers of times, there were Universes formed not so different from this Universe. For instance, there was one Universe where instead of having white sparkling stars there were thousands and thousands of letters from every alphabet that ever existed spelling out all sorts of words including "pig," "ape," "dork," "dork-head," "dolt," "nerd," "noodle," "duck," and "dingle-doopsy" in the night sky. In some Universes, instead of the moon, the sky held a giant bottle cap which would rise slowly over the mountain tops.

Around one lonesome star a handful of planets, circled in an endless, elliptical dance. On one of these planets there was a jungle, lush and green, filled with all manner of plant and animal. One of these animals was Harry the Ape whose long

Harry the Ape

Once well, really not just once, but a thousand times, no a million times, no, an infinite numbers of times, there were Universes formed not so different from this Universe. For instance, there was one Universe where instead of having white sparkling stars there were thousands and thousands of letters from every alphabet that ever existed spelling out all sorts of words including "pig," "ape," "dork," "dork-head," "dolt," "nerd," "noodle," "duck," and "dingle-doopsy" in the night sky. In some Universes, instead of the moon, the sky held a huge nose that would rise every night over the mountain tops. Usually this was OK except when the nose had a cold and then it would sneeze all over the houses and cars. Of course the farmers would eagerly collect all the moon-snot which turned out to be a very effective fertilizer.

Around one lonesome star a handful of planets, circled in an endless, elliptical dance. On

Thread - "External Wiring for Charging" - Netscape

File  Edit  View  Go  Communicator  Help

Focus: (tree) (col) (undo)   Read: (no) (yes)   Size: (focus) (focus+) (stdd) (small) (mini)
1        2        3        4        5        6        7        8

880. Evered: While I have the batteries out of the bikes, I'm toying with the idea of installing 'pigtails' on each of them, so that I can check the charge level and even charge the batteries without removing the seal, air box, side panels, etc. just to get at the batteries ('80 kz400ltd and 81

908. Götke: <Q> I have absolutely no clue what a "14 gauge" is. I usually measure wire cross-section in mm.³. However, for a 1 amp 1093. Murphy: <Q> May I suggest installing an accessory plug instead of pigtails? Then you can add a heated vest, gloves, et cetera. Go to a John Deere dealer. (I assume you are in North America.) Order p/n AL25073 and p/n RE11344. Total should be $10-12,

1130.

918. Evered: Thanks for the advice. A 14 gauge is roughly the diameter of the wire used in the household table lamp cord.

1118. Scooter: I went to the local farm store, bought a foot of wiring under $2, a box of connectors $.59, and wired a pigtail to the positive terminal which the one they put out of the way (the neg is easily accessable). Use the plastic covered M/F slip

1098.

929. Götke        920.

1136. Bike: <Q> If it's not fused, no matter how much care you take not to let the end of it touch anything, you're running a risk. Fuse the line. Trust me. It can be very expensive if you don't.

1108.

968. los4blanch   963.   961.

1446. Scooter: Scooter shows his lack of good learnin by writin... Fuse the ends? Either I'm not understanding what you mean, or I didn't explain myself well. I know I probably didn't use correct terminology, I admitt it's not my field of work. I am

1125.

977. Götke

1449. Pedersen: <Q> I think it has to do with Murphys law, I always fuse the positive wire if I connect something to the battery. It is a precaution, and it only cost a fews cents, so why not. Even if a battery

1582.

986. Penner

991. Götke 1016.   1023.

*FIG. 12*

| Once upon a time there was a Universe | | | |
|---|---|---|---|
| dark and big with a sugar dusting of stars | | filled with swirling galaxies, exploding novas, swift comets, deadly asteroids, a few wandering space ships, lots of old TV shows in the form of ever expanding television signals, | |
| unevenly dispersed through the blackness. By the way, let me note that there is another kind of universe, one that has a blinding white sky. | unevenly scattered through the sky. | and the occasional black hole. | including: Father Knows Best, I Love Lucy, The Thigh Trimmer Infomercial, and many more. |

*FIG. 16*

Once upon a time there was a Universe ◯ dark and big with only a sugar dusting of stars ◯ spread unevenly dispersed through the blackness. By the way, unevenly let me note that there is another kind of Universe, one through the that has a blinding white sky. In that white sky there bleakness. are dark spots called "anti-stars" which the scientists ◯ of that Universe think are probably black holes. ◯ filled with swirling galaxies, exploding novas, swift comets, deadly asteroids, a few wandering space ships, lots of old TV shows in the form of ever expanding television signals, ◯ many different creatures from many different planets in many different colors. ◯

(including Father Knows Best, Soul Train, Wheel of Fortune, Sailor Moon, Dexter's Lab, Ally McBeal, Jeopardy, The Thigh Trimmer Infomercial, 60 Minutes, General Hospital, Looney Tunes, Petticoat Junction, and 25 different Backstreet Boys videos) and lots of abandoned space stations. ◯ and the occasional black hole. ◯

(including creatures who lived on the surfaces of huge planets and who were made equal by gravity; creatures who floated in outer space eating space dust; creatures who lived quiet, but warm, lives in the centers of giant, burning suns and hippie communes that had been set up in old abandoned space stations. ◯ dust (which is much more nutritious than most scientist believe) and cyborg robots holed up in old space stations who only listened to The Grateful Dead and The Backstreet Boys. ◯

These Universes are just like ours except that everyone talks backwards and that one is born old and grows younger day by day as ◯

These universes are just like ours except that everyone works very hard to relax and goes to sleep when they want to work. The people with the best dreams ◯ get paid the highest salaries. ◯ get their dreams published in the evening "Dream News" which is distributed throughout the galaxy (and only costs 25 cents at local 7-11s). The best dream ever recorded was ◯ about a giant red haired ape who ate bananas and pooped out books of poetry. ◯ about a tiny mouse who lived on the foot of a huge ape and who liked to curl up between the ape's toes. She helped keep the ape's toes free from athlete's foot as her rent. ◯

FIG. 18

Select action (* and select cell;  and select cell;  and fill text area)  HELP!!

Edit: ○ Extend**  ○ Set text*  ○ Get text*  ○ Delete cell*  ○ Merge**  ○ Undo edit  ○ Copy story
View: ○ Add foci*  ○ Delete foci  ○ W/Focus  ○ W/O Focus  ○ Mini  ● Same View Story "harrysmailmod"

Once upon a time there was a Universe ○
dark and big with only a sugar dusting of stars ○
unevenly dispersed through the blackness. By the
way, let me note that there is another kind of
Universe, one that has a blinding white sky. In
that white sky there are dark spots called "anti-
stars" which the scientists of that Universe think
are probably black holes. ○

These universes are just like ours except that
everyone works very hard to relax and goes to
sleep when they want to work. The people with
the best dreams ○ get paid the highest salaries. ○ filled with swirling galaxies, exploding novas,
swift comets, deadly asteroids, a few wandering
space ships, lots of old TV shows in the form of
ever expanding television signals, ○
many different creatures from many different
planets in many different colors. ○

(including creatures who lived on the
surfaces of huge planets and who were
made equal by gravity; creatures who
floated in outer space eating space ○ dust (which is much more nutritious
than most scientist believe) and
cyborg robots holed up in old space
stations who only listened to The
Grateful Dead and The Backstreet
Boys. ○

Submit | Reset

Fill text area if needed

AUTHORING TOOLS, INCLUDING CONTENT-DRIVEN TREETABLES, FOR FLUID TEXT

BACKGROUND OF THE INVENTION

1. Field of Invention

This invention relates to methods of computer mediated text and graphic display.

2. Description of Related Art

Fluid documents are documents in which information contained in the text of the document is connected to other text or other information such as, for example, a textual annotation. Related disclosures of fluid documents include U.S. patent application Ser. No. 09/098,942, U.S. patent application Ser. No. 09/098,451, U.S. patent application Ser. No. 09/794,100, and U.S. patent application Ser. No. 09/098,451, now U.S. Pat. No. 6,230,170, each incorporated herein by reference in its entirety.

Fluid document techniques disclosed in the '942 and '951 applications provide methods for dynamically presenting a primary body of data displayable on a graphical user interface and a supporting body of data relatable to the primary body of data. The primary body of data can include an "annotation tag" or "knob" associated with a specific region and referring to the supporting body of data. When a region of user focus at or near the annotation tag is selected in the primary body of data, the supporting body of data is dynamically displayed, i.e., displayed for as long as the user focus is maintained on that region. The data present in the primary body of data is concurrently modified to enhance presentation of the supporting body of data. When the user focus changes, the annotation tag or knob is restored and the primary body of data reverts to its original format.

The primary body of data can be primarily textual, primarily graphical, or some mixture of textual and graphical elements. Thus, the term "data" encompasses both textual and graphical elements. Similarly, the annotation tag or knob can be primarily textual, primarily graphical, or some mixture of textual and graphical elements. The annotation tag may be a numeric tag such as, for example, a footnote numeral, greeked or unreadably small interlinear or marginal text, a symbol such as, for example, an asterisk, a hypertext link, or a thumbnail graphic or drawing in the margin and may have different color attributes. In certain applications, the annotation tag may be a very small, yet still readable, version of the supporting body of data. In other applications, lines, curves, or graphical or textual animations can allow a user reviewing a primary body of data to identify the availability of supporting data. While typically a visual cue, in certain applications, the annotation tag may be visually imperceptible to the user until a pointer or other indicator of user focus is directed at a region to which the annotation tag is related. In certain applications, the annotation tag can be based on auditory or tactile feedback, with, for example, sound, operation of force feedback mice, or tactile displays providing audio or tactile annotations.

Treetables are a particular type of visualization for hierarchical or tree-structured data. A tree is a classic, abstract computational structure consisting of nodes and directed edges or links. A tree has a single root node, which has no parent node, and all other nodes have a single parent node. A parent is connected to each of its children by an edge or link from the parent to the child. Nodes with no children are called leaf nodes. A path in a tree is a sequence of nodes such that each node, except the last node in the sequence, is followed by one of its children.

Treetables are table-like visualizations of trees whose structural clarity is equivalent to that of direct node+edge representations, but which provide more space for data within the displayed nodes, and which make the root-to-leaf paths more easily perceptible. Related disclosures of treetables include U.S. patent application Ser. Nos. 09/954,388 and 09/954,530, each incorporated herein by reference in its entirety. The treetables disclosed in '388 and '530 are structured so that a cell representing a tree node exactly spans the cells representing its successors. The columns of the treetable therefore represent the root-to-leaf paths of the tree. Also, the treetables disclosed in the above applications contain regular rows, so that all cells representing tree nodes at the same distance from the tree root are of the same height. The amount of data that can be included in a cell is thus determined by the height assigned to cells of its row. The above application '388 and '530 provide methods for structuring treetables of this type. They also provide methods for deeper exploration of their content in several ways. One such method is by focus operations causing in situ expansion of the space allocated to a particular column or subtree, thus increasing the amount of data that can be displayed in those regions. Another such method for deeper exploration is by extracting subparts of the treetable into another such structure, allowing more space for individual cells. Another such method is by using the treetable's as a guide to the reading, in auxiliary displays, of the full concatenated content of all nodes associated with either (a) individual columns, or (b) all the successors to a given node. A particular use of treetables in applications '388 and '530 is for the visualization of email threads.

SUMMARY OF THE INVENTION

This invention provides systems methods and tools for creating and/or visualizing and/or exploring, including authoring and/or editing, any sort or type of tree-structured data, including taxonomies, topic hierarchies, classification systems, threaded e-mail conversations, outlines for organizing concepts or as a pre-writing tool, and an authoring and/or editing tool for a hypertext narrative system called fluid text. As noted above, fluid text incorporates additional information into a page by adjusting typography using interactive animation. The typography adjustment can be triggered through user input such as, for example, finger touch, point and click, and mouse rollover. The systems and methods of this invention also extend the treetable visualization and associated methods described in U.S. patent application Ser. Nos. 09/954,388 and 09/954,530 to better serve the needs of authoring fluid text and other uses with similar properties. The resultant extension is hereinafter termed "content-driven treetables".

In general, WYSIWYG fluid text editors according to the systems and methods of this invention allow a user to interact with the fluid text viewing system described above and in the '100 application in ways that go beyond viewing previously-defined primary and secondary content. WYSIWIG (what you see is what you get) fluid text editors allow users to edit the primary and secondary content by inserting, deleting, or modifying the displayed text in the customary way of direct manipulation text editors. Standard graphical user interface text editing functions, such as insert, delete, word wrap, and cut and paste functions, perform as usual. Another exemplary embodiment of a WYSIWYG fluid text editor also allows users to modify the structure of the primary and secondary content—that is, to change which portions are primary and/or secondary, and/or to add or remove portions of the hierarchy. In addition, WYSIWYG fluid text editors allow users to modify formatting appearance and/or behavior parameters of the fluid text viewing system, either by visiting a forms-based web page that contains a field for each parameter, or via a customary formatting property sheet to specify formatting appearance and behavior.

In various exemplary embodiments, this invention separately provides two editors, one a WYSIWG editor, and one a treetable-based editor, which can be used separately or in combination, to make such structural and design issues readily addressable. In exemplary embodiments of the systems and methods according to this invention, a fluid authoring tool allows the specification of document design and textual behaviors. The systems and methods according to this invention may facilitate creative and educational uses of fluid text, and/or provide a more generally applicable facility in the form of content-driven treetable text editing.

In various exemplary embodiments, the systems and methods according to this invention are able to define and/or edit the appearances and behaviors of a fluid text document. In various other exemplary embodiments, the systems and methods according to this invention are able to author and/or edit the text and story logic, that is, the underlying hierarchical data. Such authoring and/or editing is a more convoluted process than ordinary linear writing, or writing for a current popular model of hypertext mark-up language (HTML). In various other exemplary embodiments, the systems and methods according to this invention are usable to extend the capabilities of treetables to better serve both fluid text authoring applications and other similar applications.

Moreover, WYSIWYG fluid text editors can, upon request, track and display the viewing history of changes made within the fluid text to permit users to know where they have been and where they are.

BRIEF DESCRIPTION OF THE DRAWINGS

These and other features and advantages of this invention are described in, or are apparent from, the following detailed description of various exemplary embodiments of the systems and methods according to this invention, with reference to the accompanying drawings in which:

FIG. 3 is a visualization of a narrative which includes knobs or annotation tags;

FIG. 4 is a visualization of the narrative of FIG. 3 after opening a knob or annotation tag;

FIG. 5 is a visualization of a narrative with swoopy text;

FIG. 7 shows a visualization of swoopy text as a result of opening two knobs or annotation tags;

FIG. 8 shows a visualization of the narrative of FIG. 3 with several examples of swoopy text;

FIG. 11 is a visualization of a structure driven tractable representing an e-mail thread;

FIG. 12 shows the treetable of FIG. 11 with a focus on column 5 of the visualization in FIG. 11;

FIG. 16 is a visualization that displays the result of using a structure-driven treetable to display all of the content of a tree used for a fluid text authoring application.

FIG. 18 shows the layout obtained by using the algorithm of FIG. 17;

FIG. 22 shows a view of the treetable of FIG. 20 with two different focus cells and associated focus areas;

DETAILED DESCRIPTION OF EXEMPLARY EMBODIMENTS

Figure 1:
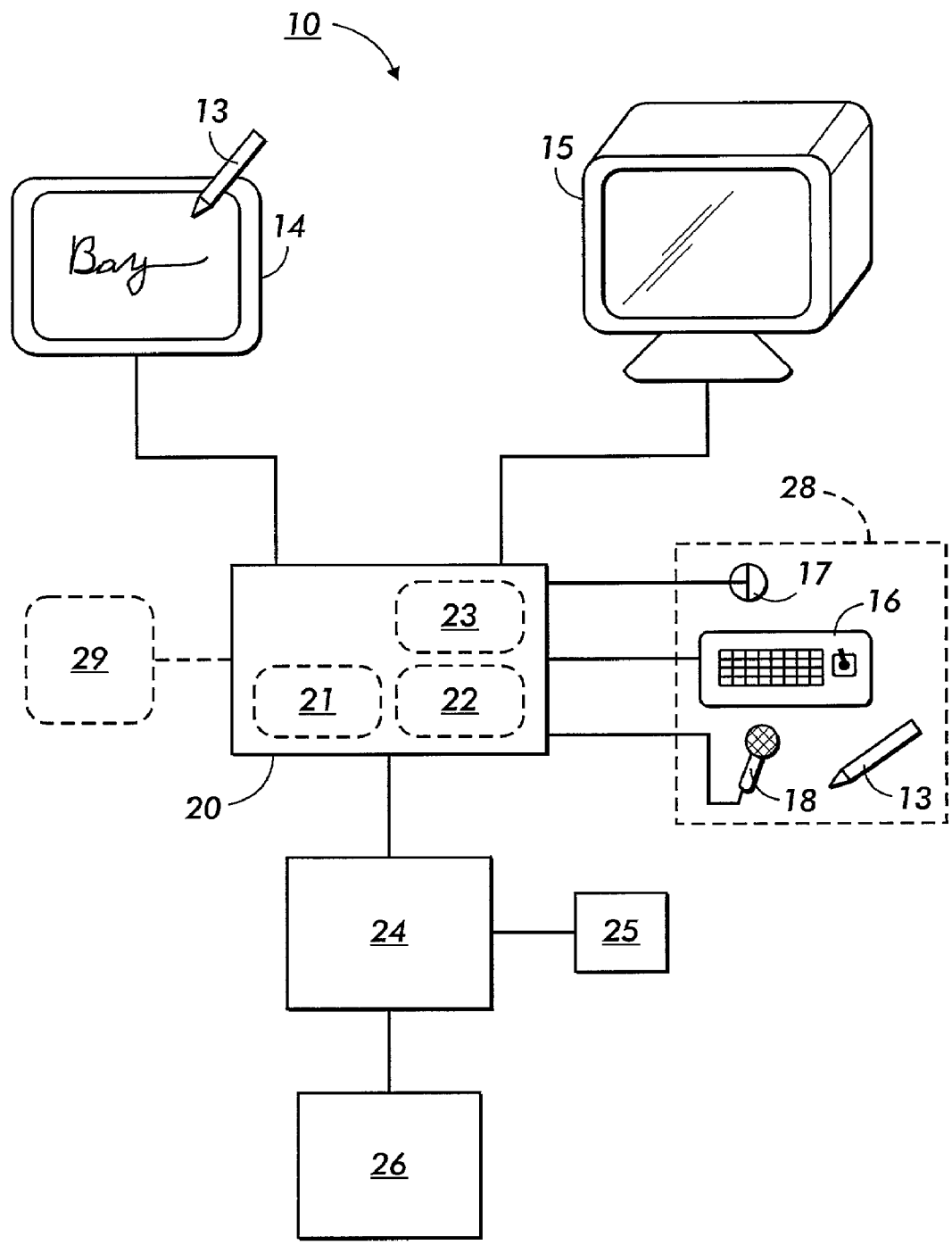
FIG. 1 is a schematic view of a computer and electronic display system suitable for implementing various exemplary embodiments according to this invention.

Co-pending application Ser. No. 09/794,100 provides systems and methods that modify the primary body of fluid document data in response to user focus to "content-connect" the primary body of data to a secondary body of data such as, for example, alternative text or modified primary text, and may displace one or more portions or streams of the primary body of text.

In various exemplary embodiments of the systems and methods according to the '100 application, the shape of the portions of the primary and/or secondary bodies of data are changed by curving or "swooping" those portions of the primary and/or secondary bodies of text to display a selected secondary body of text such that the selected secondary body of data becomes physically connected to content of the primary body of data. Portions or streams of the primary body of data are displaced. One or more secondary bodies of data may augment the curved primary body of data and/or may be substituted for the displaced primary body of data. The systems and methods of the '100 application display one or more secondary bodies or streams of data to augment the content of an original body or stream of data and/or to replace the content of an original body or stream of data. The systems and methods of the '100 application can be used to aid in viewing alternate endings to stories or portions of stories, and/or to modify the content or meaning of a text portion in a primary data stream.

In various exemplary embodiments of the methods and systems according to the '100 application, a primary body of data is displayed on a graphical user interface. A user can select a region of user focus. In response, a transition data portion is generated to connect the primary data stream with a secondary body of data displayed based on the selected region of user focus. This secondary body of data may include, for example, an alternative body of data or a body of data that modifies the content and/or meaning of the primary data stream.

In various exemplary embodiments of the systems and methods according to U.S. Pat. No. 6,230,170, supplementary/supporting tutorial or graphical annotations are dynamically displayed over a primary source page. Accommodation of the supporting/supplementary body of data (which includes text and graphics) may be through overlays or spatial morphing of a primary body of data.

In other various exemplary embodiments, a user can add, using a keyboard, a pen-operated touchpad, voice control software, or another suitable input device, one or more secondary bodies of data, such as, for example, alternative text or modified text, to be associated with the region of user focus. The primary data stream is modified by generating the transition data portion, for example, by changing a selected portion of the primary data stream into a curved format that connects the primary data stream to the secondary body of data.

A taxonomy is an orderly classification of subject matter. One example of a taxonomy is the United States Patent Classification System which, in general, is a hierarchical classification system wherein the subclasses typically have an inclusive nature. Another example is the International Patent Classification System which, in general, is a faceted type classification wherein the subclasses generally do not have an inclusive nature. The U.S. Patent Classification System also has definitions and search notes. The systems and methods of this invention are clearly applicable to such taxonomies, as well as to other taxonomies. In one exemplary embodiment according to the systems and methods of this invention, content driven treetables may be prepared for each major outdented subclass and the subclasses indented thereunder and/or for each one-dot indent and the subclasses indented thereunder; or for any subclass, whether it is a major outdent, a one dot indent, a two dot indent, etc., and the subclasses indented thereunder. In another exemplary embodiment according to this invention, an entire class and all subclasses thereunder may be visualized as a content driven treetable-structure. Moreover, class and/or subclass search notes and/or definitions may also be edited as fluid text using the systems and methods of this invention.

With respect to application of the systems and methods of this invention to fluid text, as noted above, a primary fluid text will include "knobs" or "annotation tags" which, when triggered, will cause the current primary text, such as a sentence, to animate. In other words, the current primary text or sentence pulls apart to reveal another, secondary text. Many visual parameters of the animation such as, for example, timing, spacing, whether some portion of the primary text fades away or not, can be adjusted. These fluid text layers of text, or image, can be embedded within each other so that several layers of authored content can be embedded in a single top-level text phrase or sentence.

Keeping track of behaviors, design logic, and story logic can be complicated in such a fluid text system. As noted above, in various exemplary embodiments, this invention separately provides two editors, one a WYSIWG editor, and one a treetable-based editor, which can be used separately or in combination, to make such structural and design issues readily addressable. In exemplary embodiments of the systems and methods according to this invention, a fluid authoring/editing tool allows the specification of document design and textual behaviors. The systems and methods according to this invention may facilitate creative and educational uses of fluid text, and/or provide a more generally applicable facility in the form of content-driven treetable text editing.

In various exemplary embodiments, the systems and methods according to this invention provide fluid text authoring systems suitable for users ranging from naive users to expert users. For example, the authoring tools may range from simple web-based WYSIWYG story creation systems for children to full-featured text/image editors that incorporate a treetable editor for adult writers.

In various exemplary embodiments of the systems and methods according to this invention, a number of appearance items of the visualizations of this invention are controlled. These appearance items include fonts which include the main body, title, subtitles and their style and size. Another appearance item to be controlled is color, including background color or image color, and text color at each level. Another appearance item controlled by the systems and methods according to this invention is the text, including the main body font, the title font, subtitle fonts, including the face, the size, the style, the text color at each level. These may be defaults and can also have special cases thereof. Other appearance items that are controlled include an image in the background. Other appearance items controlled are margins, indentation, and leading. Other appearance items that are controlled are knob appearance for choosing alternatives, including the size, shape and color of the knobs, the number of forms that may be multiple forms, and whether or not they are open or closed and also their placement. Another appearance item that is controlled by the systems and methods of this invention is the amount of swoop, including the length and height of the swoop.

In various exemplary embodiments, behavior items can also be controlled similarly. These behavior items include timing, the number of alternative endings that can be open simultaneously in the fluid text viewer, and other animated parameters.

Appearance parameter adjustments may include, for example, font characteristics like size and color, knob shape, the amount of text to bend or swoop to connect the primary material to the secondary material background color/texture, and window and margin sizes. Behavior parameter adjustments may include, for example, timing parameters specifying how many seconds or milliseconds the primary text should take to animate into its bent or swoopy shape and how long it should take for the secondary text to appear or disappear; animation methods for the display and/or removal of secondary text, such as zoom, window shade, or dissolve; animation sequences depicting opening and closing knobs; whether some portion of the primary text should fade away or not; and similar interactive adjustments. Moreover, as noted above, the WYSIWYG fluid text editor can upon request track and display the viewing history within the fluid text, so as to show users which portions of the secondary information has been seen already in one or more editing/viewing session(s).

Typically, a treetable-based editing tool focuses on content and structure of a text, and in the context of constructing a fluid text narrative, is most appropriate for constructing more complex fluid texts by more sophisticated users. The content-driven treetables used for this purpose differ from the treetables and associated methods disclosed in U.S. patent application Ser. Nos. 09/954,388 and 09/954,530 in several ways. First, they relax the requirement for regular rows, and permit the use of slightly more general structures including converging paths. Next, new layout methods appropriate for such treetables are provided. Finally, the set of operations is extended to permit the specification of multiple, simultaneous foci, and interactive editing The systems and methods according to this invention include a sequence of such treetables, for example, a backbone with alternative tendrils sprouting from each segment. A single tree can represent material smaller than a single sentence, larger than a single sentence, or a single sentence.

Various exemplary embodiments of the systems and methods according to this invention are effective for use in classrooms, such as, for example, a grammar school creative writing class, or a high school writing seminar. In various exemplary embodiments, the systems and methods according to this invention may also be used as a type of shared on-line resource, similar to a "blog", which is short for a web log. In various exemplary embodiments, the systems and methods according to this invention may also be implemented as a museum exhibit which employs fluid text, allowing a museum visitor to construct, and/or edit, their own fluid text.

Although the systems and methods according to this invention application are described in terms of being web-based, a standalone application for adult writers, such as web writers using fluid text on-line, or people writing for a fluid text museum instantiation, or a college level writing workshop, for example, for those interested in dynamic text, may be employed according to the systems and methods of this invention. In such a case, the final fluid text would appear not in a browser but as a product of the particular application. The systems and methods according to this invention contemplate various exemplary embodiments, including both WYSIWYG and treetable editors that allow behavioral editing, design editing, and/or text editing. In addition, coloring the treetable node contents using the same colors as any existing fluid text appearance property, help authors bridge between both WYSIWYG and treetable forms.

In various exemplary embodiments, the systems and methods according to this invention involve a number of editing requirements for fluid text. In various exemplary embodiments of the systems and methods of this invention, the reader of the text is a person. In various exemplary embodiments of the systems and methods of this invention, the viewer, the system and the presentation system is considered to be a presentation system which controls appearance, timing, and other characteristics for the document and/or the viewer. Additionally, in various exemplary embodiments, the presentation system allows the adding and removal of nodes at any point in the tree. In various exemplary embodiments, this may include moving nodes around to provide easier functionality, may allow changing the content of any node in the tree, and/or may allow authors and proofreaders to track what has been seen and not seen during a proofreading step.

In various exemplary embodiments of the systems and methods according to this invention, the WYSIWYG editing of fluid texts provides various menus and/or property sheets to edit all of the appearance items listed above. For example, an author can insert, delete, or move knobs. When a new knob is inserted, the internal structure of the document is altered. The author can also alter text content between knobs in a standard WYSIWYG editing fashion in various exemplary embodiments. The current fluid text system can be read using a touch screen user interface, without a mouse interaction device. However, in various exemplary embodiments, the WYSIWYG editing system according to this invention may have a more conventional user interface, with for example a mouse or a stylus device for easy selection between characters, inside menus, etc.

In various exemplary embodiments, the systems and methods according to this invention also allow for inserting breaks between trees as well as breaks between nodes. Fluid texts show a path through a sequence of tree structures. The point where one tree ends and the next begins is not ordinarily visible from a static view of the text. A special command, analogous to the P-mode in conventional WYSIWYG editors, places/removes a visible marker at the end of each tree structure to help authors understood where to position knobs. Authors can also insert and/or remove tree breaks and they may also insert and/or remove trees. In various exemplary embodiments, the systems and methods according to this invention include the ability to insert knobs, which are equivalent to node breaks. In various exemplary embodiments, to improve animated display performance, the fluid text implementation may represent each text line or the contents of each underlying node as one active string, rather than as a sequence of individually modeled selectable and animatable characters with their own surrounding object bounding boxes. When the user selects a text region by clicking over it, that string will be replaced by a corresponding sequence of active characters, to enable insertion or deletion of text or knobs or tree breaks within that region.

In various exemplary embodiments of the systems and methods according to this invention, to insert knobs, an author may select a character and insert a knob either before or after that character. Selecting an arbitrary character may need an active character. Active characters may be obtained by preselecting an active string. After the knob is placed, the internal tree structure is modified accordingly, and the active characters can be reconverted to active strings if desired. In various exemplary embodiments of the systems and methods according to this invention, to insert knobs, an author may tear a knob off of an interactive menu and drag it to a spot and release it. Detents can place the knob between words or between characters. In various exemplary embodiments, the overall graphical user interface system according to this invention can determine the position of each character to determine where to split the active string into two active strings. In various exemplary embodiments of the systems and methods according to this invention, to insert knobs, an author could insert the knob coarsely and then move it using cursor controls backward and forward along a line. Additionally, an author can insert a new knob into the middle of a swoop. This would change the swoop, moving its start point to occur earlier, in general, than it previously did. Swooping characters are already active characters, because such swooping characters are often individually placed along a spline. The effect of inserting knobs on the text tree is such that the visible text from the inserted knob to the next knob or to the end of the text or to the end of the current tree, whichever comes first, becomes the left (.1) child of the original node. The content of that node is truncated at the point of the new knob. In various exemplary embodiments, the author opens the knob to type into the right (.2) child of the original text. It should be noted that the term "text" as used herein encompasses content such as images, videos, and the like, in addition to or in lieu of text.

In various exemplary embodiments of the systems and methods according to this invention, one may also delete knobs. In various exemplary embodiments, the author can, for example, select a knob using, for example, a shift-select interaction to avoid opening the knob instead, and either hit the DEL key or select a left arrow delete-knob right arrow item from a menu. The effect of deleting a knob on a text tree is such that the content of the node that precedes the knob is concatenated, that is, joined consecutively, with the content of the child of the node that is currently being displayed, such as, for example, the left node if the knob is closed and the right node if the knob is open. The other sibling nodes are deleted. A dialog box to allow the user to confirm deletion of any hidden node should appear, and the node contents may also be placed in a cut buffer for further paste operations.

In various exemplary embodiments of the systems and methods according to this invention, one may move knobs. Moving knobs allows a user to select and move a knob by direct manipulation, and effectively moves text from one node to another. The hidden subtree is unaffected by moving knobs, although it may not join well to the new location of the knob. As a result, in various exemplary embodiments, the "visited" coloration of the knob may change to "this level not visited".

In various exemplary embodiments, the WYSIWYG editor according to this invention provides support for proofreading. Because the fluid text presents dynamic text, it can be difficult for readers to track their progress through a text. As with a hypertext environment, an important question to be answered is, "Have I seen all of the material?" This problem also arises for authors and/or proofreaders when they are trying to check contextual presentation of each node in a tree. For example, do subjects and objects agree across node boundaries? Authors and proofreaders must be able to ensure that all possible views have been checked. In various exemplary embodiments, tracking and recoloring followed paths will occur according to this invention is used to help the author and/or proofreader understand what has and has not been seen. This functionality is also useful simply for readers of the fluid text.

In various exemplary embodiments, user focus on an annotation tag can be determined by tracking the position of a conventional screen displayed pointer maneuverable by a mouse, a stylus, or a keyboard, by use of touch-sensitive overlays to a screen, eye or head tracking systems, or any other known or later developed mechanism for reliably determining a user's focus on a region of a graphical user interface display. In various exemplary embodiments, dynamic displaying supporting information relative to the user focus can be initiated in response to user-initiated mouse clicks, keyboard input, finger taps, duration, such as, for examples, by detecting that the cursor has been held still, on or adjacent to an annotation tag for a certain period of time, for example, or any other suitable input scheme for confirming a user's desire to view supporting bodies of data. It should be appreciated that typical values for the certain period of time are, for example, one tenth of a second to about two seconds, with one second being typical.

In various exemplary embodiments of the systems and methods according to this invention, a content-driven treetable editor is disclosed which can show a custom view of an entire hyperstructure designed for ease of reading and editing. Unlike the treetables of U.S. patent application Ser. Nos. 09/954,388 and 09/954,530, regular rows of information are dispensed with. Instead, in various exemplary embodiments, the system according to this invention determines the height and/or width of each cell individually, based on the content to be displayed in that cell. In various exemplary embodiments, the content-driven treetable editor according to the systems and methods of this invention comprises a treetable structure and layout mechanism, and editing operations in the context of the visualization. In various exemplary embodiments, the layout mechanism assigns actual dimensions to each cell by a procedure that tries to minimize the height of the table as a whole within a nominal approximate width. In various exemplary embodiments, the content driven treetable editor according to this invention allows converging paths of a restricted kind, allowing treetables to represent partial orderings somewhat more general than trees. Additionally, in various exemplary embodiments of this content-driven treetable editor, a collection of treetables, comprising a logical collection of, for example, paragraphs, can be displayed simultaneously. The edit operations permit interactive development and modification of treetables.

FIG. 1 illustrates one exemplary embodiment of a fluid narrative hypertext treetable system 10. As illustrated in FIG. 1, the fluid narrative hypertext treetable system 10 includes a data processor 20 connected to one or more display devices 14 and/or 15. The data processor 20 includes a processor 21, electronic memory 22, and long term storage 23. The data processor 20 is connected to input module 28, which may contain one or more devices, including a pen-based device 13, a conventional keyboard 16, a mouse device 17, one or more microphones 18 for audio input, pen-based or gestural input devices, paper scanning input, or any other supported input mechanism.

In addition to visual display output through the display device 15, various non-visual output is possible with an output module 29, which may include, but is not limited to, audio output, tactile output, force feedback output (with force feedback mice or joysticks), text and graphics printers, or any other suitable output mechanism.

As shown in FIG. 1, the data processor 20 can be connected to the output module 29 over a link 26, and to a remote data storage device 24 over a link 25. The links 25 and 28 can be any known or later developed device or system for connecting the data processor 20, including a direct cable connection, a connection over a wide area network or a local area network, a connection over an intranet, a connection over the Internet, or a connection over any other distributed processing network or system. In general, the links 25 and 26 can each be any known or later developed connection system or structure usable to connect the remote data storage device 24 and the output module 29, respectively. Further, it should be appreciated that the links 25 and 26 connecting the links 25 and 26 to the data processor 20 can each be a wired or wireless link to a network (not shown). The network can be a local area network, a wide area network, an intranet, the Internet, or any other distributed processing and storage network.

Figure 2:
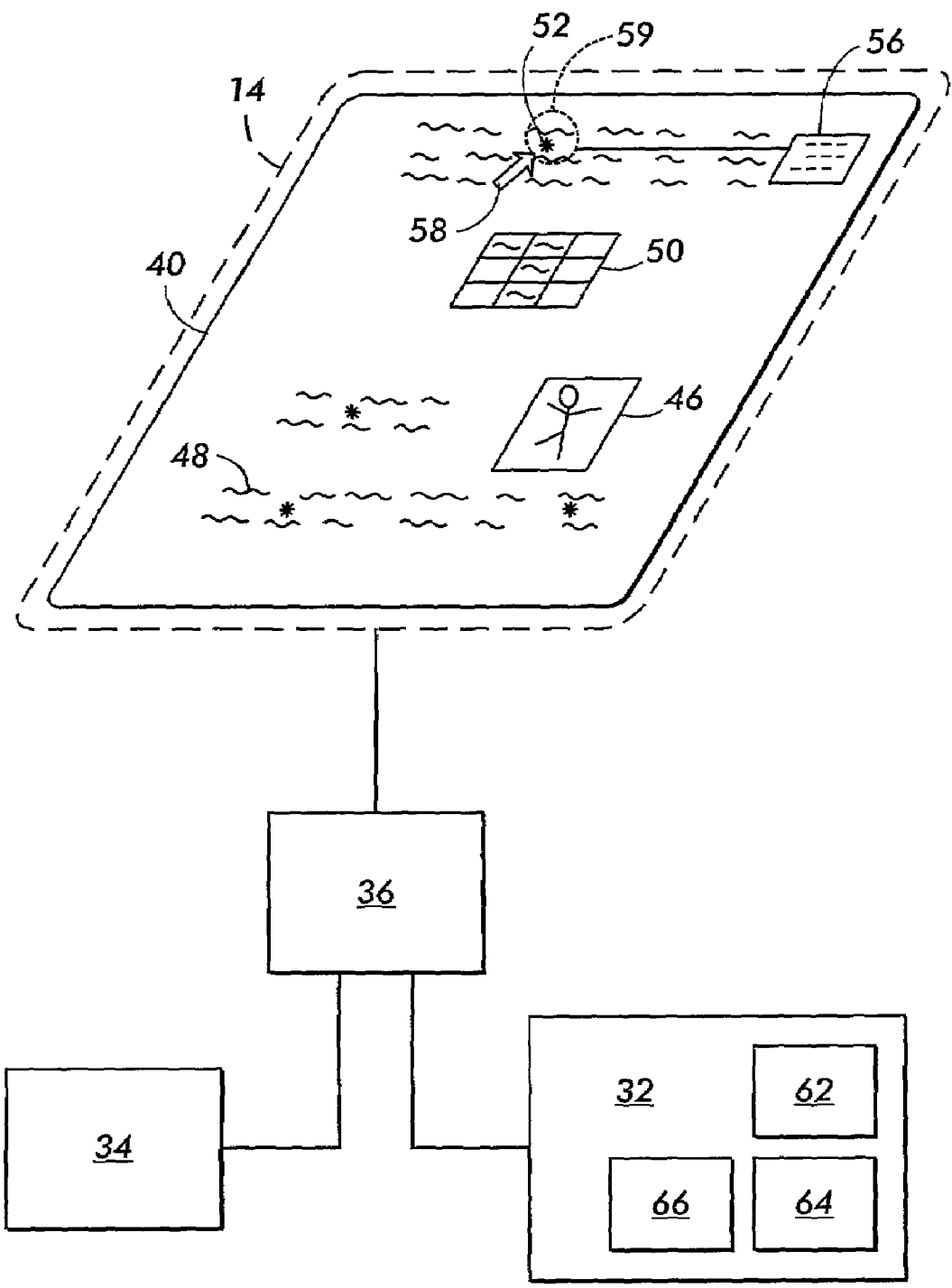
FIG. 2 is a schematic view illustrating a text and graphics display view, a visual representation of a primary body of data, and a visual representation of a supporting body of data capable of being integrated with the primary body of data to together provide the text and graphics display view.

As shown in FIG. 2, a display 14 presents a computer-controlled graphical and textual display 40 to a user. The graphical and textual display 40 is created by negotiation, for example, using negotiation module 36, a software module executing on data processor 20 between a primary body of data 34 and a supporting body of data 32, derived from various sources of data 62, 64, or 66,. As shown in FIG. 2, the display 40 includes text 48, graphics 46, tables 50, and various annotation or comment tags 52. The annotation or comment tag 52 is associated with textual data from one of sources of data 62, 64, or 66 and can be selected by moving a mouse operated cursor 58 into a region of user focus 59, initiating, in various exemplary embodiments, an animated launch sequence that results in, a "callout" textual annotation or comment 56 being displayed. The expansion animation typically takes anywhere from about a quarter second to about two seconds, sufficient for allowing a user to keep visual track of the expanding animation and maintain proper contextual focus. In various exemplary embodiments, when user focus changes by movement of the mouse cursor, the annotation tag is replaced and the primary body of data reverts to its original format by a reverse, contracting animation. It should be appreciated, the animation speed can be fully controllable, with high speed "pop-up" display annotations being presented for brief annotations, and longer animations being used for more complex annotations positioned far from the annotation tag or "knob."Exemplary details of such expansions are disclosed, for example, in incorporated '100 application.

As shown in FIG. 1, the system 10 is in various exemplary embodiments implemented on a programmed general purpose computer. However, the system according to the invention can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 6 and 7, can be used to implement the methods of this invention.

As shown in FIG. 1, the memories 22 and 24 can each be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-writable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

It should be understood that each of the circuits shown in FIGS. 1 and 2 can be implemented as portions of a suitably programmed general purpose computer. Alternatively, each of the circuits shown in FIGS. 1 and 2 can be implemented as physically distinct hardware circuits within an ASIC, or using a FPGA, a PDL, a PLA or a PAL, or using discrete logic elements or discrete circuit elements. The particular form each of the circuits shown in FIGS. 1 and 2 will take is a design choice and will be obvious and predictable to those skilled in the art.

FIG. 3 (as well as each of FIGS. 4–7) shows a story entitled "Harry the Ape" being presented by the fluid text viewing system to illustrate fluid text.

FIG. 3 shows a screen of fluid text which displays a complete path through the hierarchical fluid text structure at one time. Each triangle indicates a choice point in the narrative and thus marks a boundary between one node and another. To view a different path through the story, the reader selects a triangle by, for example, touching a touch screen or clicking a mouse. The triangle may rotate in a particular direction such as, for example, in a downward direction, and may also turn a different color. The previous path from that point onward gradually disappears, the segment just before the triangle curves downward, and a new path that begins at that point gradually appears.

Figure 6:
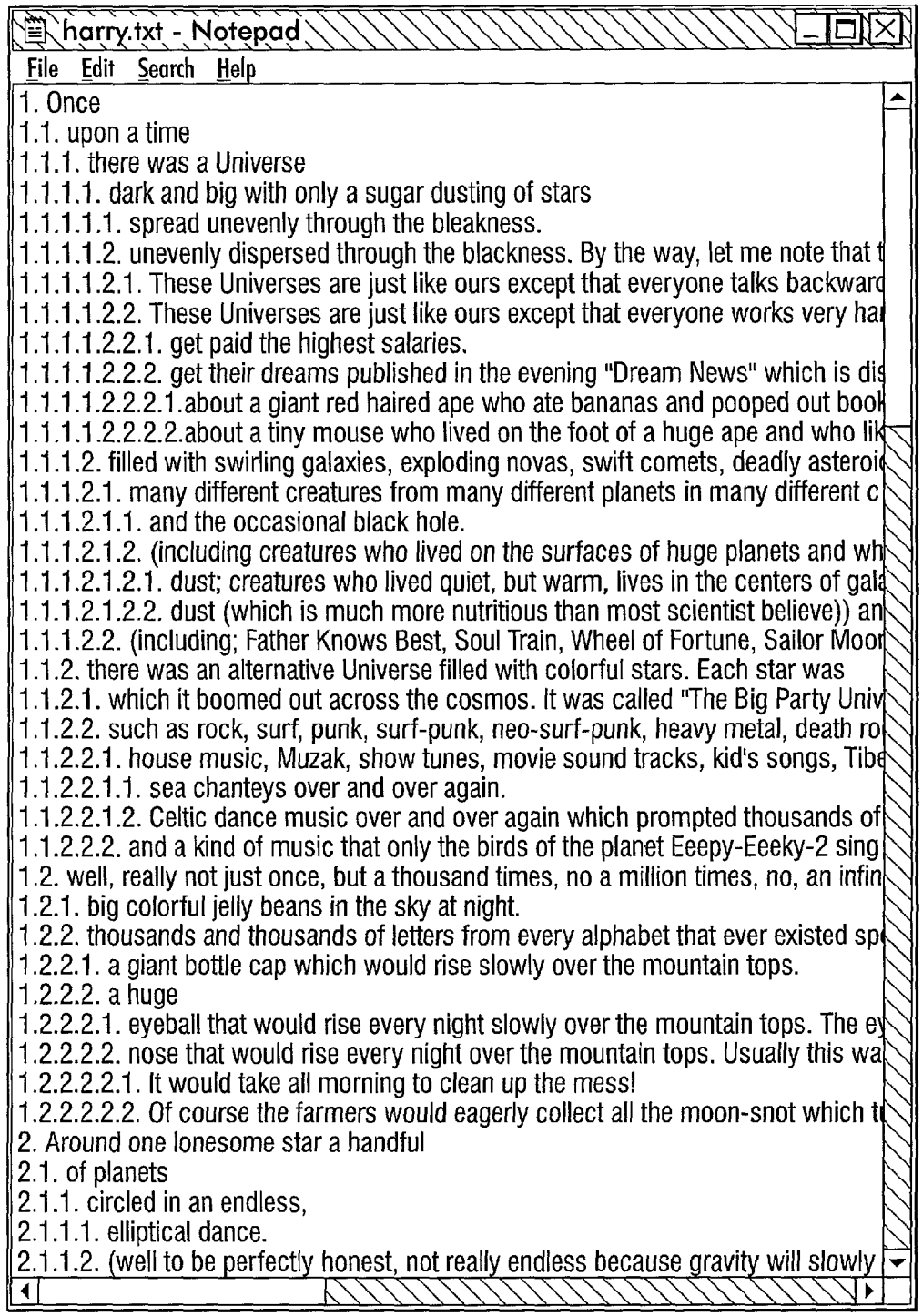
FIG. 6 shows the simple hierarchical input format to the fluid text viewing system corresponding to the fluid narrative shown in FIGS. 3–5.

FIG. 4 shows an exemplary result of opening the first triangle depicted in FIG. 2 after the word "once". FIG. 5 shows the result of opening the second triangle in FIG. 3, after the word "time". Unless a given choice point has been explicitly selected, the fluid text shown in this screen shows the first child of each node successively, ending with the leftmost leaf node beneath a selected point. FIGS. 6 and 7 show continued exploration in this screen. Continued exploration of fluid text is also disclosed in the incorporated '100 application.

Figure 9:
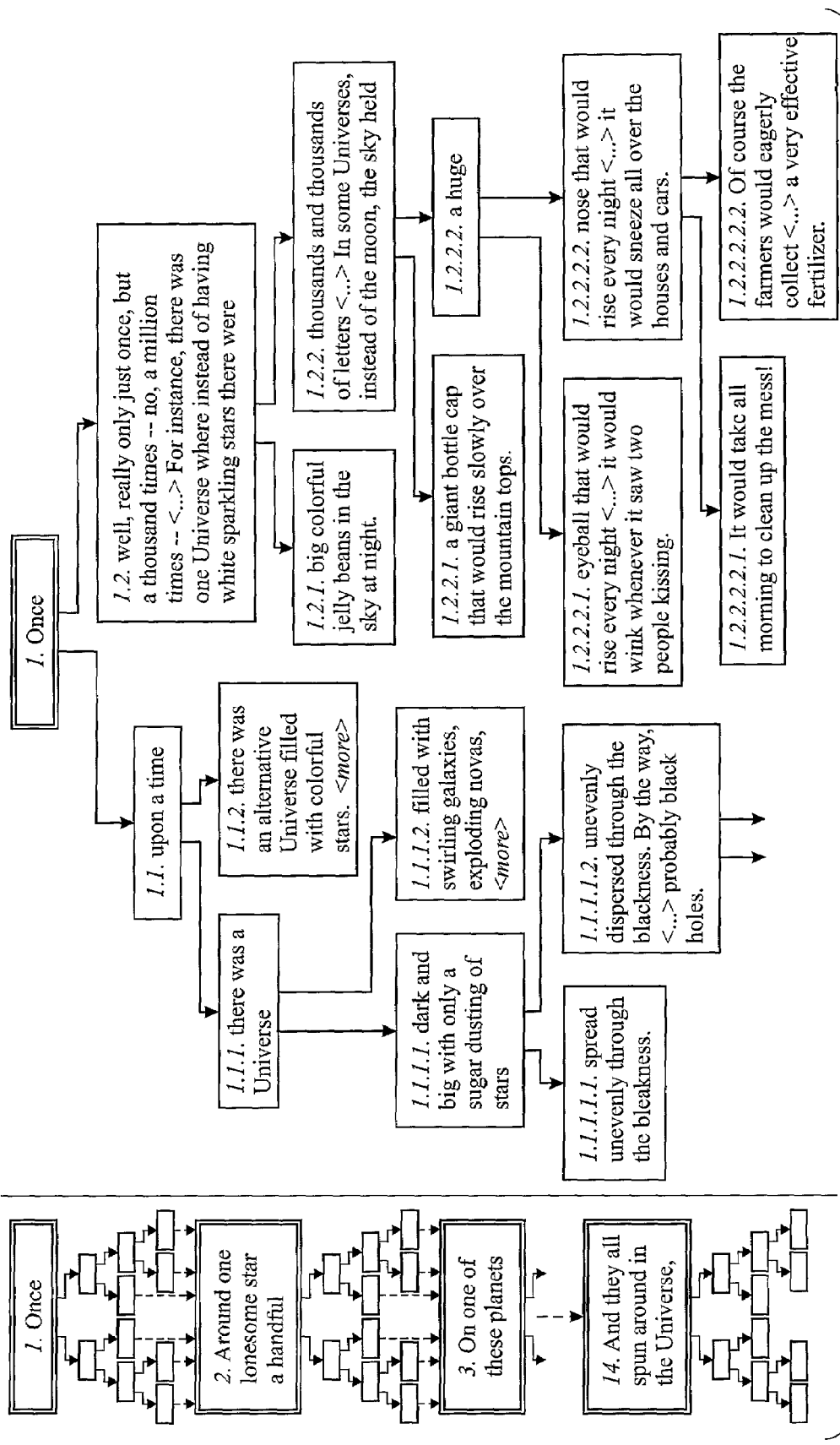
FIG. 9 shows a standard tree representations of the fluid text content for the narrative shown in FIG. 3.
Figure 10:
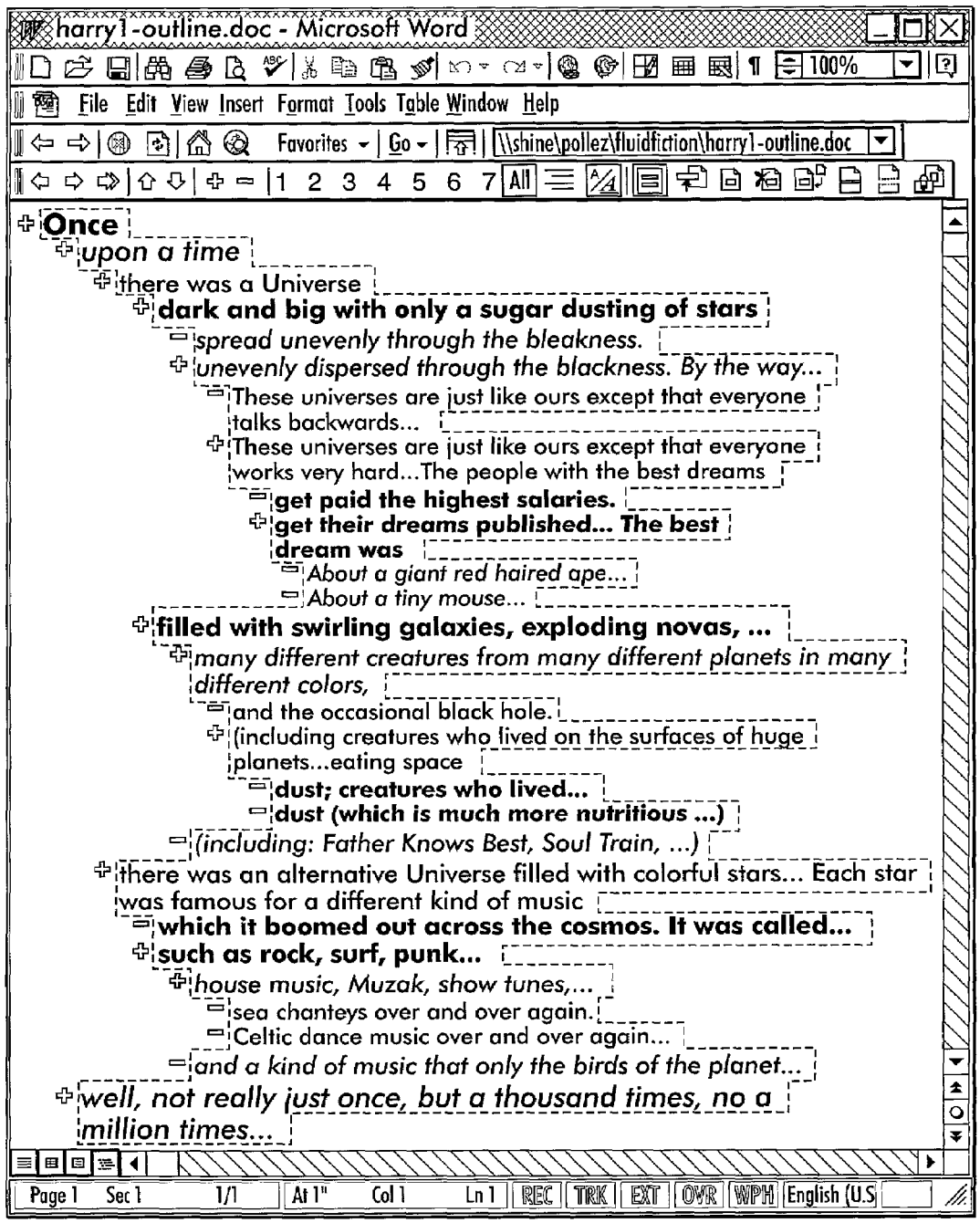
FIG. 10 shows a conventional word processor outline mode being used to construct the fluid text content shown in FIG. 3.

The fluid text display shows a sequence of tree structures. The interface does not show the boundary between two successive trees explicitly, but the interface can be deduced from interaction with the hypernarrative; that is, paths from successive trees are merely pushed up or pushed down the screen as alternative paths open and close. If, for example, the fluid text can only display one non-default path at a time, then when a reader chooses an alternative in a tree, any previously opened alternative in another tree is closed before the new alternative is displayed. In the narrative example presented in FIGS. 2–7, each sentence in the original or top level story shown in FIG. 3 is a separate tree, for a total of 12 trees in all. FIG. 9 shows custom translator conversions of the text outline format of FIG. 10. In FIG. 9, the outline is converted into a numbered format. The left side of FIG. 9 shows an overview of the entire story as a sequence of trees. The right side of FIG. 9 focuses on the tree structure for the first sentence of the story. Nodes 1., 1.1., 1.1.1., 1.1.1.1., and 1.1.1.1.1. are visible in the initial view of the story, whereas the double-outlined nodes are visible in every view of the story. FIG. 10 shows a partial content tree visualization of the text shown in FIG. 3. A straightforward custom translator can generate the format of FIG. 6 from this representation.

This accommodation overcomes a major problem associated with conventional hypertext window or "balloon help" techniques. Such annotation techniques simply overlay a small graphic or window over a primary body of data, often covering necessary information in the primary body of data. In contrast, the systems and methods disclosed in the '942 and '451 applications conduct a negotiation between the primary body of data and the supporting body of data to determine suitable alterations to the position, size, color and/or spatial morphology of text or graphics that best present salient portions of the primary body of data, while still allowing the supporting body of data to be viewed. Ideally, obstructions to viewing both the primary body of data and the supporting body of data can be minimized. However, in certain embodiments, partial obstruction of the primary body of data may be necessary to accommodate the presentation of salient information. An appropriate negotiation for the fluid text viewing system might include shrinking regions of text that are farther from the current focus region in order to make more space for the system to display additional alternative paths.

Figure 11:
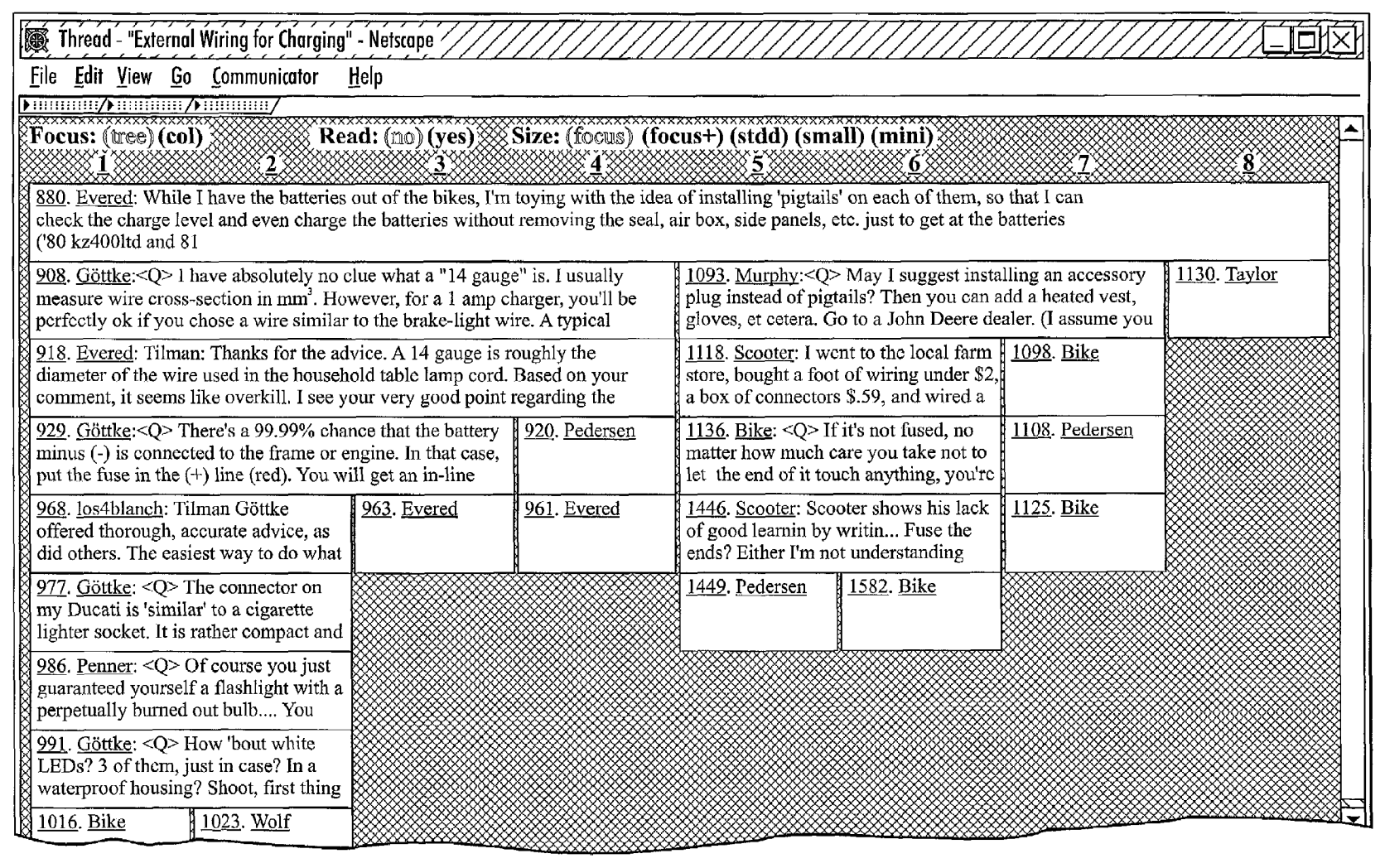

Examples of the original treetables, which we may call structure-driven treetables, disclosed in U.S. patent application Ser. Nos. 09/954,388 and 09/954,530 are shown in FIGS. 11 and 12. A structure-driven treetable representing an e-mail thread is shown in FIG. 11. In that structure, each column represents a single path from the root to a leaf, and each cell exactly spans the cells representing its children in the tree. The layout, except when explicit focus areas have been selected, is very regular. All leaf cells have essentially the same width, and the width of any non-leaf cell is the product of the standard column width and the number of leaves of the subtree for which it serves as a root. Moreover, all cells in the same row have a fixed, application-determined height (but different rows may have different heights). The amount of content that can be displayed within a cell is determined by the structure, that is, it varies depending on the width of the cell, as described above, and the height assigned to the row in which the cell occurs. This results in a regular display clearly depicting the structure of the underlying tree, and is suitable for its intended use as a guide to exploring different aspects of that tree in more detail. The basic geometry of structure-driven treetables ensures that more space is available for text in the bushiest subtrees, which are often those generating the most interest. In this case, for example, we have arbitrarily located those subtrees on the left.

The original structure-driven treetables were designed to allow the display of indicative portions of arbitrarily large amounts of node content, and the methods disclosed in U.S. patent application Ser. Nos. 09/954,388 and 09/954,530 allow them to be used as a base for more detailed exploration of tree content. One way of performing more detailed explorations, illustrated in FIG. 12, is adapted from "focus plus context" and "fisheye" approaches, in particular, ones like TableLens described in U.S. Pat. No. 6,085,202 by Rao and Card, in which the regular structure is preserved, thus limiting difficulties in reorientation when shifting among focus areas. The adaptation of focus operations to treetables allows either subtrees or individual columns to be selected as foci, and to be expanded to different degrees. In FIG. 12, column 5 is selected. The selection causes the column to be highlighted and expanded to allow more room for text for cells spanning that column.

Figure 13:
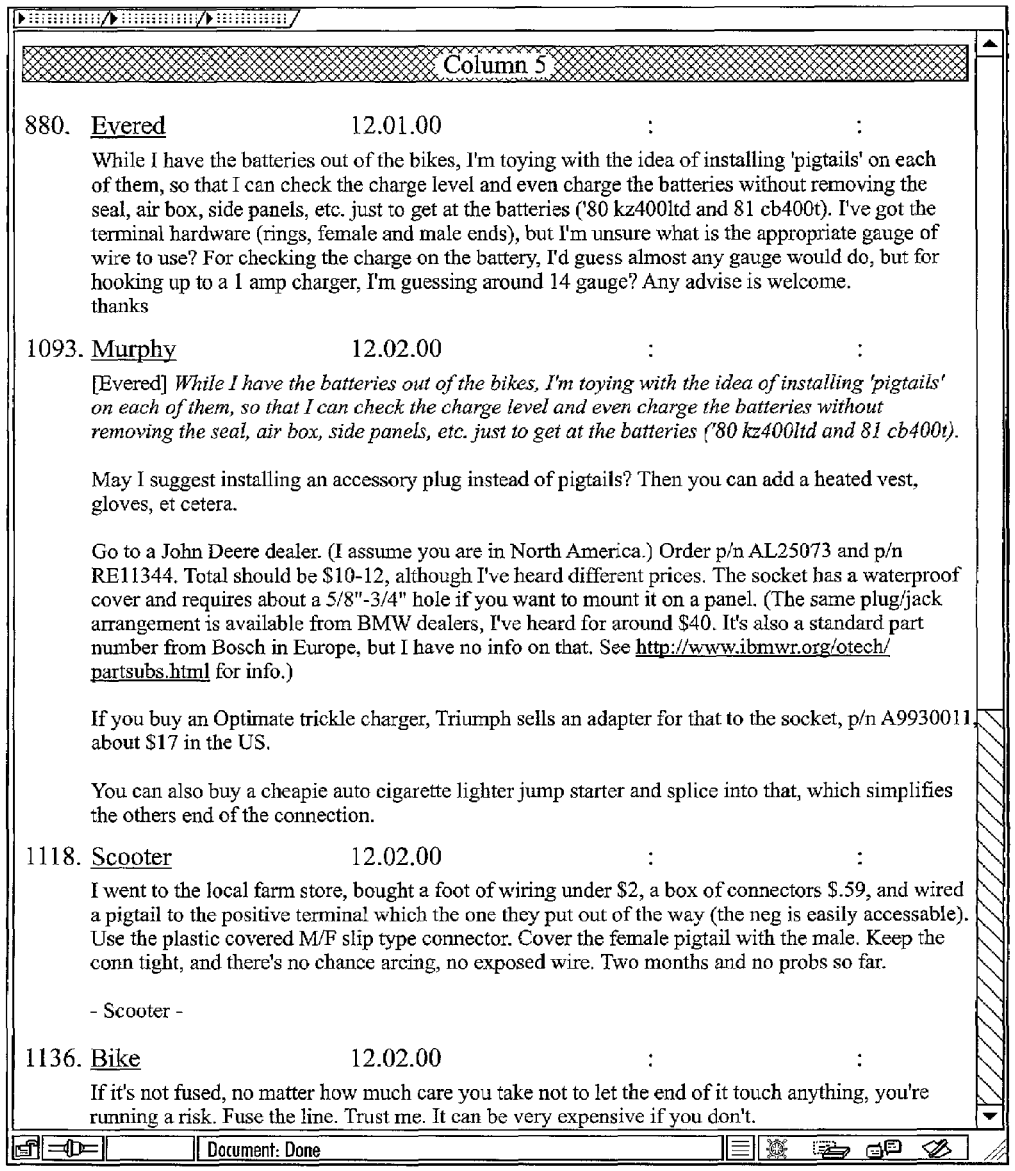
FIG. 13 is a display presenting the full essential text of a column of email messages. The full essential text shows the main message content but omits extraneous material such as detailed header information, redundant quoted excerpts, and contact information.
Figure 14:
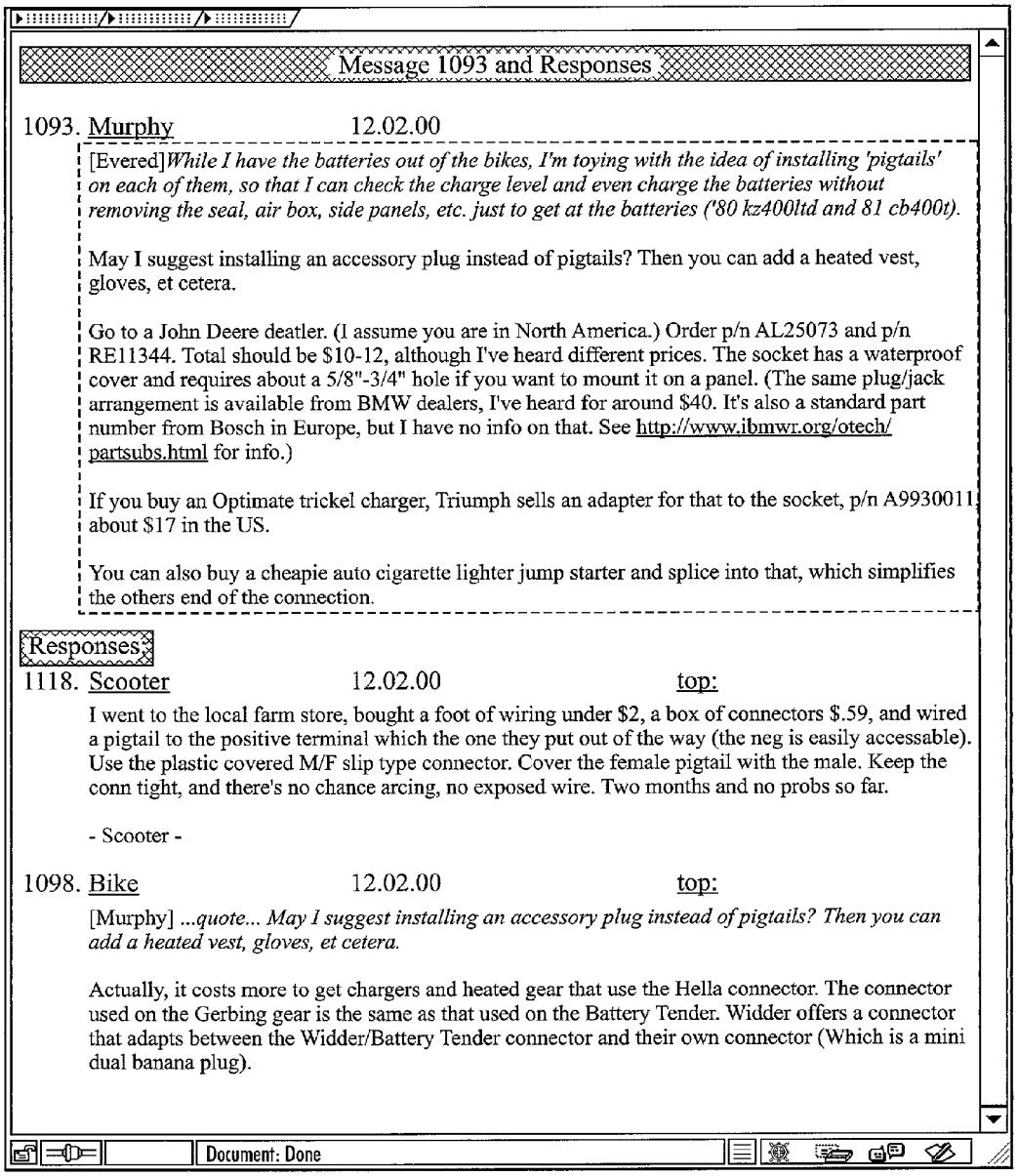
FIG. 14 is a display of the full essential text of immediate responses to a message.
Figure 15A:
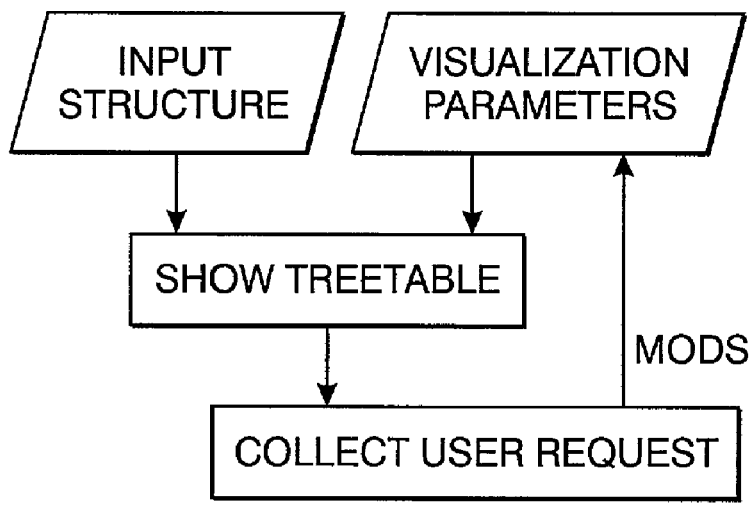
FIG. 15a shows the flow of processing to allow investigation of existing tree structures to show paths and subtrees and focus on and expand particular columns or subtrees and to extract subtrees to other windows.
Figure 15B:
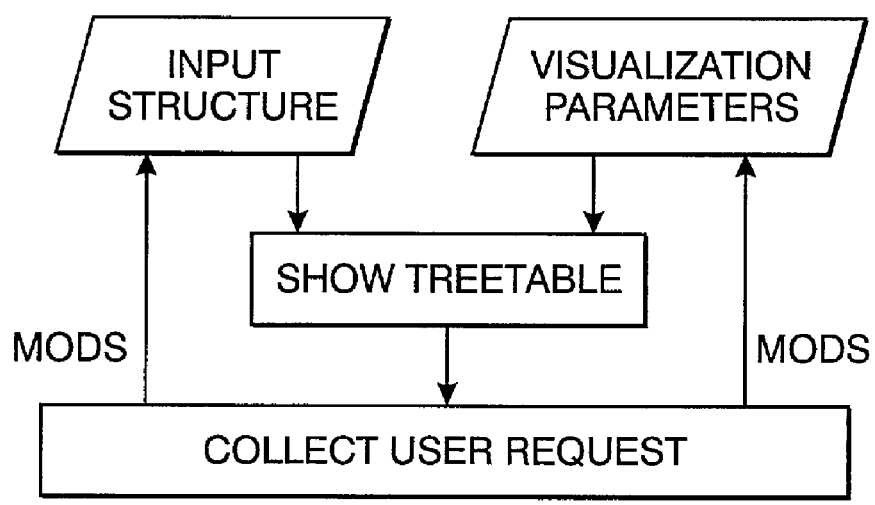
FIG. 15b shows a flow of processing to obtain an alternative visualization from those shown in FIGS. 11 and 6, and to permit user inputs and modifications to the treetable content

In various exemplary embodiments, for full reading of the underlying content, structure-driven treetables are used as guides to auxiliary displays presenting the full text of either a column, as shown in FIG. 13, or of a node and its immediate successors, as shown in FIG. 14. In both cases, the selected region on the treetable guide is highlighted to maintain context. For treetables representing a stored conversation of a discussion list or newsgroup, the column displays in many cases read like theatrical scripts These original treetables provide a means of exploring existing tree structures, so that their associated user interactions comprise a collection of mechanisms allowing closer investigation of paths and subtrees including the ability to focus on and expand particular columns or subtrees, and to extract subtrees to other windows. The resultant flow of processing can be abstracted as shown in FIG. 15A. The systems and methods according to this invention provide alternative visualizations using content-driven treetables, and associated layout mechanisms, and then additional user interface operations used for authoring, giving rise to modifications to the processing flow, as shown in FIG. 15B. As shown in FIG. 15B, user requests are collected and may be used to modify input structural and/or visualization parameters or other parameters of the content driven treetable(s), and the modified content-driven treetables are displayed. The process loops until user input stops. In the discussion of processing, below, the terms "top-down" and "bottom-up" processing are used. These terms simply designate the order of processing of nodes in a tree structure. In "top-down" processing, parent nodes are processed before their child nodes. In "bottom-up" processing, child nodes are processed before their parent nodes.

The fluid text described in the patents referenced above display one path through the text at a time, with interactive reader controls to permit dynamic display of different alternatives. However, in various exemplary embodiments of the systems and methods according to this invention, various phases of the authoring task, especially proofreading, are substantially improved by a treetable visualization that can display multiple paths, including all of the paths, simultaneously, together with all the data associated with the paths.

In contrast, the original structure-driven treetables, which were designed for displaying only portions of node content, are not optimal for this purpose, because of the regular row structure. In the fluid authoring application, different amounts of text are associated with each cell, so retaining regular rows would require allocating a maximal height to each row. As illustrated in FIG. 16, for a tree having seven nodes and four leaves, this in turn would result in a large amount of white space, interfering with readability, and limiting the amount of material that can be conveniently displayed.

Therefore, according to the systems and methods of this invention, an alternative type of treetable, called a content-driven treetable is disclosed. In a content-driven treetable, while each cell still exactly spans the cells representing its children in the tree, cells representing different children may have different heights. Also, columns may have different widths (even in the absence of focusing operations) in order to minimize wasted space and limit the height of the whole. One example of the systems and methods according to the invention is shown in FIG. 18. In various exemplary embodiments of the systems and methods according to this invention, when content-driven treetables are used for fluid text authoring, each vertical path represents a reader-selectable version of the narrative, where each successive level of the tree represents a choice point among several alternatives. This visualization allows authors both to see the entire structure of the narrative and to read each alternative path conveniently, by reading vertically through the tree table. This layout is particularly useful for the proofreading phase of the authoring task, because the author can check grammar, including punctuation, subject-verb agreement, and the like, across the parent-child boundary for each of the children of the node. In addition, this visualization allows an author to compare different paths easily and simultaneously. In contrast, access from a previous fluid text reader view would require successive views, separated by one or more alternative selections to transition from the view of one path to the other.

In various exemplary embodiments of the systems and methods according to this invention, the layout mechanism for content-driven treetables can be used to assign fixed dimensions to each cell, viewed as superimposed on a grid of display units, to obtain a relatively shallow (root to leaves) representation within a given approximate width. A shallow representation allows larger treetables to be viewed without scrolling. A shallow treetable representation given a particular width is one that approaches the rectangular, that is, minimal space is wasted by leaf nodes that do not reach the bottom of the rectangle. To minimize wasted space, the subtrees whose roots are the immediate descendants of a particular node should have widths roughly proportional to the amount of information contained within each subtree. For example, given a tree containing only a root of given width W and two leaves, one containing 100 characters and the other containing 50 characters, allocating "child" rectangles with respective widths $C_1$ and $C_2$, where $C_1$, equals $2*C_2$, and $C_1+C_2=W$, would be an appropriate choice in many situations. So, a basic allocation algorithm would simply assign widths recursively top-down. Each child C of a parent P is given a width proportional to the size of the subtree rooted in C, relative to the size of all subtrees rooted in children of P, or $W_P*S_C/S_o$, where $W_P$ is width assigned to the parent, $S_C$ the number of characters of text associated with the subtree rooted in C, and $S_o$ the total number of characters of text associated subtrees rooted in all children of P. In cases where the characters of the display font have varying widths, this technique and the more refined techniques described immediately below, can be generalized in a straightforward way to substitute the sum of the lengths of text strings for the number of characters.

The geometry of more complex treetables generally requires a somewhat more refined approach, for two reasons. First, any non-leaf subtree consists of a root and some descendants. The treetable cell allocated to the subtree root must span those descendants and, thus, its area will often be larger than that needed to contain its associated string. In other words, given a string of length sl, and an arbitrary cell width w, the string must be divided into h lines, where h is the smallest integer not less than sl/w. So, so there would be (w*h)−sl characters of empty space. Therefore, a method for assigning space to subtrees based on their relative character counts should take into account that wasted space to some extent. In various exemplary embodiments, the systems and methods according to this invention address this issue by the heuristic of assigning widths twice. In the second width-assigning pass, allocated widths are modified using augmented subtree character counts that include the wasted space within the subtree roots implied by the initial allocation. While this is an approximation, it gives quite acceptable results, as shown in FIG. 18.

Because line breaks within cells must be made at spaces or hyphens, an allocation of a particular rectangle to a cell based purely on string lengths may be insufficient to accommodate the contained string. In various exemplary embodiments, the systems and methods according to this invention handled this by a bottom-up pass that assigns final widths and heights to the cells based on the actual text to be accommodated. Thus, if the cell is too narrow to accommodate the largest word, the width of the cell is expanded, adding to the widths of predecessors in the tree. If the desired display width of the entire treetable is less than the sum of the final adjusted leaf widths, then the treetable may be presented with a horizontal scrollbar. In a further refinement of the algorithm, if the width of a cell is expanded by this bottom-up pass, one may reduce the widths of other columns, to the extent possible, so that the entire table fits within the initial nominal width.. The minimum practical width of each leaf is that in which only a few words, for example one to three words, require hyphenation. The layout mechanism algorithm without this additional refinement is shown in FIG. 17.

Figure 17:
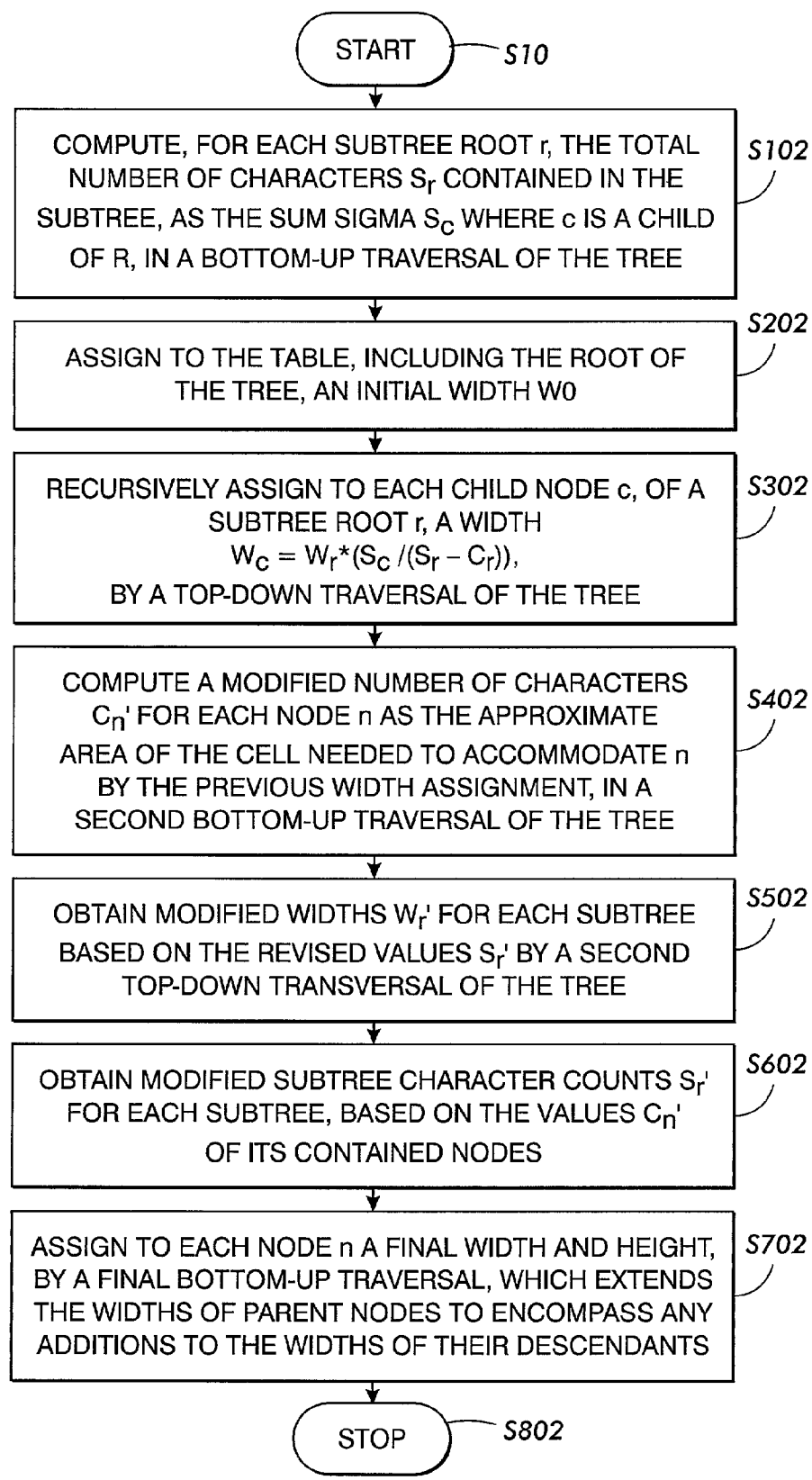
FIG. 17 shows one exemplary embodiment of a method for a layout mechanism for a content-driven treetable.

As shown in FIG. 17, control starts in step S10. Control proceeds to step S102 to compute, in a bottom-up traversal of a tree, for each subtree root r, the total number of characters $S_r$ contained in the subtree, as the sum $\Sigma S_c$ where c is a child of r. Then, control proceeds to step S202. In step S202, an initial width W0, is assigned to the table as a whole, and, therefore, to the root of the tree. Then control moves to Step S302. In step S302, control recursively assigns, by a top-down traversal of the tree, an initial width $W_c$ to each child node c of a subtree root r, where $W_c=W_r*(S_c/(S_r-C_r))$, and where $W_r$ is the width assigned to r, $S_c$ is the number of characters contained in the subtree rooted in c, and $C_1$ is the number of characters associated with the individual node r. Alternatives may be rounded in assigning widths, although this rounding may result in slightly favoring children representing larger proportions of the overall subtree bulk. Control then moves to step S402. In step S400, a modified number of characters $C_n'$ are computed for each node n, in a second bottom-up traversal of the tree. The modified number of characters is the approximate area of the cell needed to accommodate n by the previous width assignment in step S302, that is, $C_n'=H_n*W_n$, where $H_n$ is the height needed given width $W_n$, and, essentially, $H_n$=round-up($C_n/W_n$). It should be noted that different roundings give slightly different results. Then, control proceeds to step S502. In step S500, modified subtree character counts $S_r'$ are obtained for each subtree, based on the values $C_n'$ of the nodes it contains.

Then control proceeds to step S602. In step S602, modified widths $W_r'$ are obtained, by a second top-down traversal of the tree, for each subtree based on the revised values $S_r'$, using the recursive assignment method set forth in step S302. Control then moves to step S702. In step S702, a final width and height are assigned to each node by a final bottom-up traversal of the tree. The final width is the maximum of the width of the width assigned in step S602 and the widest word associated with the node. The final height is the number of lines needed to represent the text within that width. This method results in the widths of parent nodes being extended to encompass any additions to the widths of their descendants. Operation then continues to step S802, where operation of the method ends.

After cell dimensions are assigned, the results may be expressed so as to be acceptable to the actual display processor used. For example, for a standard HTML-based browser, this may take the form of a set of widths for the columns of the table, and "rowspan" specifications for each cell.

Figure 19:
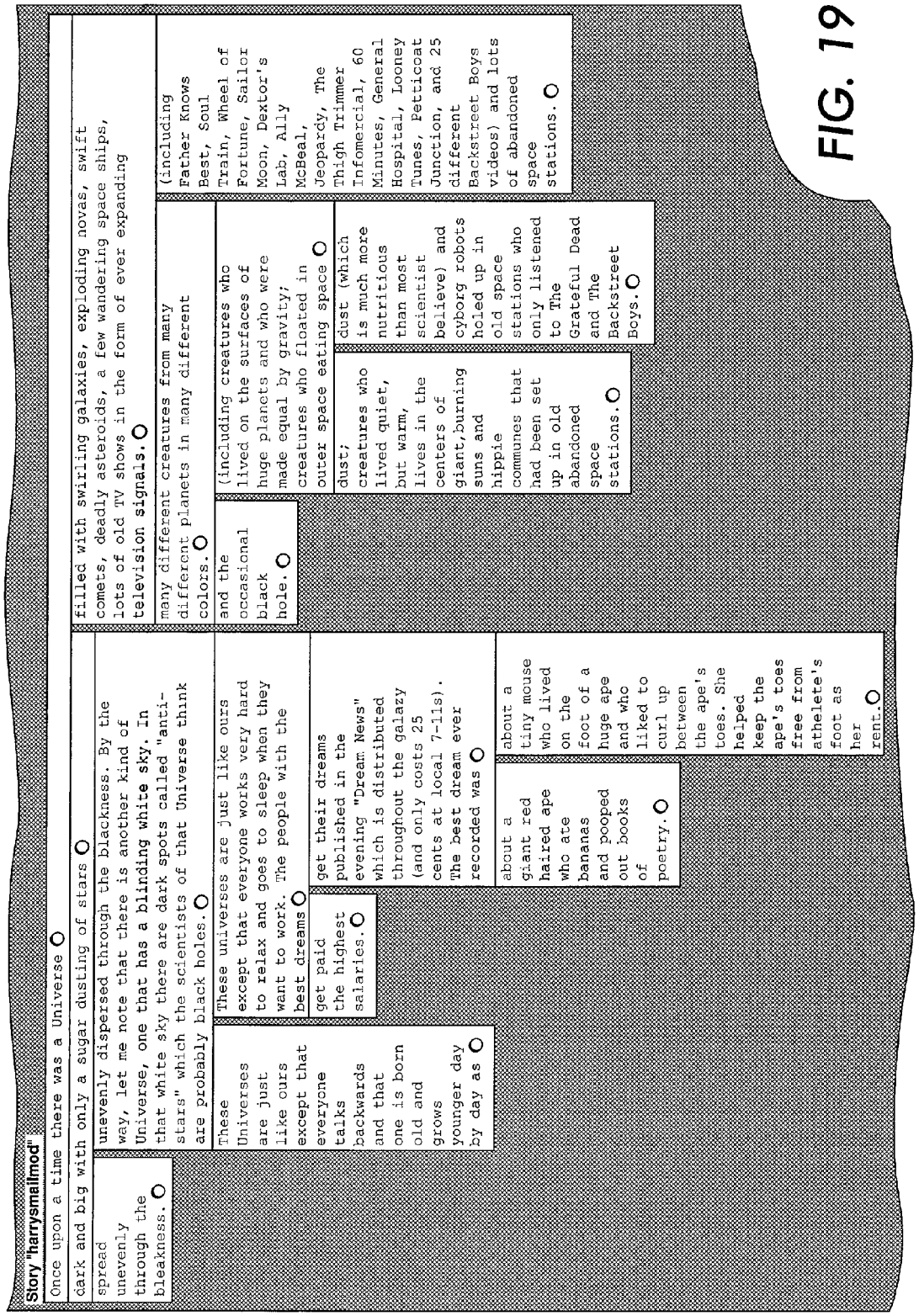
FIG. 19 shows a visualization of a layout obtained by submitting a nested table specification to a standard web browser.

In various exemplary embodiments, somewhat taller but still acceptable layouts can be obtained with considerably less computation by using a nested table specification in a standard browser. For example, each subtree would be represented by a table consisting of two rows, the first containing a cell representing the root of the subtree, and the second row comprising one nested table of the same sort for each child subtree of that root. Such a specification, together with optimizations built into the browser, would give a result such as that shown in FIG. 19, which is based on the same input as that used in FIG. 18.

Figure 20:
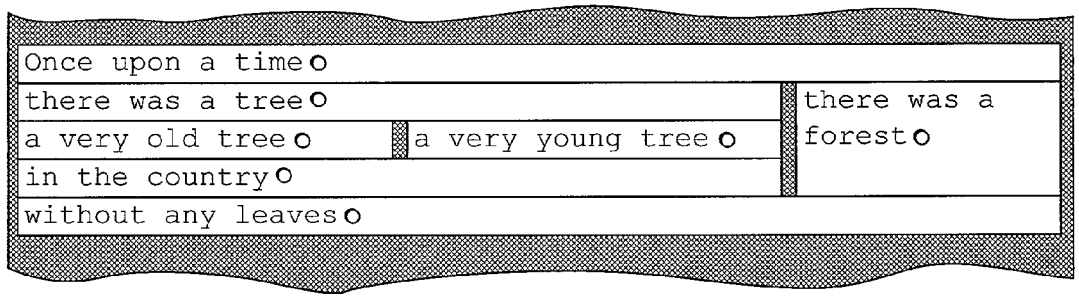
FIG. 20 shows a visualization of three paths through a treetable that merge at two separate points.

In various exemplary embodiments, the systems and methods according to this invention also employ merged paths. Because in some authoring applications the paths might represent different alternatives for a paragraph or outline, there may be some points of convergence. The points of convergence can be represented directly by a cell spanning several parents, as illustrated in FIG. 20, where both the cells "in the country", and "without any leaves" span two parents. To allow this, in various exemplary embodiments, the input structures accepted are extended from trees to a more general type of partial ordering in which anode N may have multiple parents as long as there is a back dominator B of those parents that is forward dominated by N. In other words, there are no paths from B to a leaf that do not pass through node N. As an example, we might require that a particular back dominator B may dominate only one merge node N. One way of specifying such a graph is by giving a characterized parent for each node. For non-merge nodes, the parent is characterized as "simple". For merge nodes, the parent is characterized as a "merge dominator". For example, in FIG. 22 the parent of the cell containing "in the country" would be specified as the cell containing "there was a tree", characterized as a merge dominator.

Obtaining this visualization involves additions to the algorithm previously described, at least for those cells descending from a merge dominator. In various exemplary embodiments, two additions are necessary, and one more is probably desirable. First, the widths of the subtrees descending from sequences of, possibly nested, merge dominators should be the same. To provide for this, the top-down width-assignment passes discussed in the previous section, that is in steps S300 and S600 of FIG. 17, are extended so that after processing a subtree headed by a merge dominator, ending at the predecessors of the merge cell, the associated merge cell is assigned the same width as that representing the merge dominator. The subsequent bottom-up processing shown in step S700 of FIG. 17 may modify this width because of the minimal space requirements of either the subtree rooted in the merge dominator, or the graph beginning at the merge cell. This latter processing may involve repetition, because the minimal space requirements of the two graphs may differ.

The second addition is necessitated by the fact that subpaths beginning at a merge dominator and ending at cells representing merge cells must be of uniform height. This is obtained by extending a bottom-up allocation path, step S700 of FIG. 17. During that pass, after assigning a width to a subtree contained with a "merge-dominator/merge-cell" extent, if its contained paths are not of uniform height, the heights of the cells representing the roots of its child subtrees are extended by appropriate amounts.

Finally, for purposes of readability, one may align the columns of subtrees connected vertically by a merge cell to the extent possible. For example, if a merge dominator has two child cells, and the associated merge cell has two child cells, it may be desirable to align the respective children column-wise, even if that results in additional white space. One way to do this is to consider the treetable in the area of such a merge sequence as a classic table with N fixed width columns, where N is the least common multiple of the number of leaves of the subtrees involved. The width of each cell in the area is then set based on the number of underlying columns that it spans. This approach is also useful in translating the results of treetable allocation in areas of complex merge sequences to a browser.

A third addition to the treetable technology, multiple treetable displays, is motivated by the observation that for some authoring applications, it is convenient to represent the document being developed as a sequence of parts, each of which might be represented by a treetable which might represent either a set of alternatives for the part, or just an outline for the part. While the beginning of each such part, after the first, could be treated simply as a merge cell, application considerations suggest that special treatment be given. The resultant extension provides for displays in which several treetables or their collapsed representations are shown in vertical sequence on a single display. The collapsed representations might vary depending upon the application. For example, if each tree represents a set of alternatives for a paragraph, the collapsed formulation might be one such sentence. However, if the tree represents a collection of section outlines, the collapsed formulation might be a minimal size outline treetable, as described in U.S. patent application Ser. Nos. 09/954,388 and 09/954,530.

Figure 21:
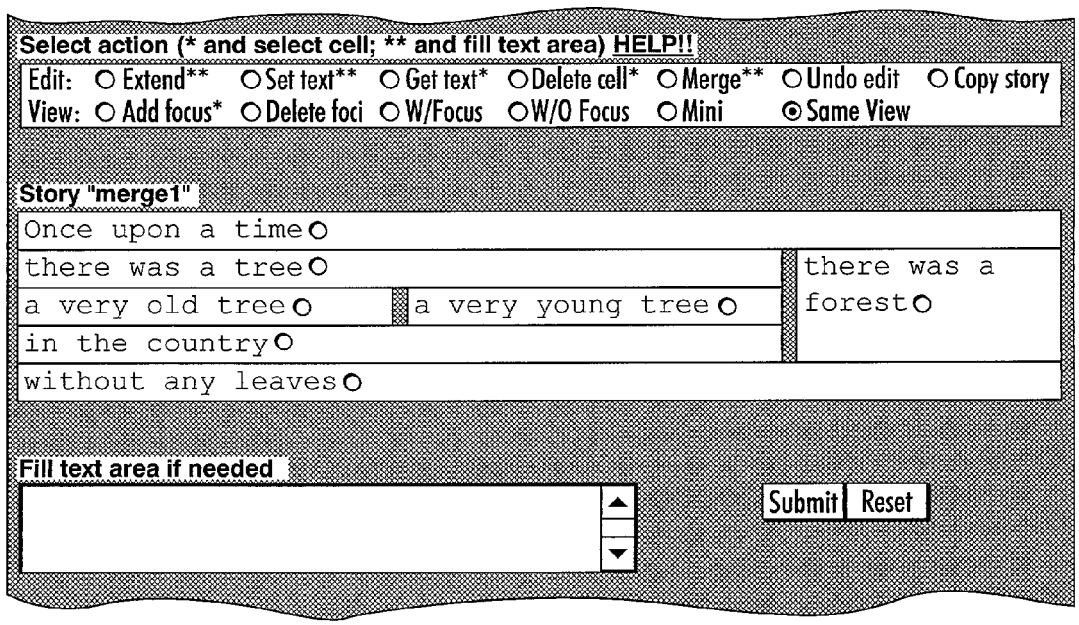
FIG. 21 displays a basic set of interaction controls for content driven treetables.

In various exemplary embodiments of the systems and methods according to this invention, a basic set of interaction controls for content-driven treetables has been developed, and is illustrated in FIG. 21, which replicates FIG. 20 and adds controls. Help text for these controls is given in Table 1. In various exemplary embodiments, the controls are divided into edit controls and view controls. Edit controls permit the addition of child cells, editing of cell content by extraction of text and replacement which, using another display mechanism, could be accomplished in situ, addition of merge cells, deletion of subtrees, and/or an "undo" to successively revert to earlier states.

The edit controls may also include: (1) provisions for tree ordering and reordering. This may include, for example, operations indicating where new child cells are to be added in the sibling order, and also operations to cut and paste entire subtrees to and from a clipboard. (2) A distinction between cell and subtree deletion, where cell deletion deletes only a single cell and attaches the children of the deleted cell to the parent of that cell, and subtree deletion deletes the cell and the entire subtree rooted in that cell. (3) Provision for parent insertion over a sequence of contiguous children, most importantly to create merge dominators for a subset of the paths emanating from a current subtree root.

In various exemplary embodiments, the current view controls are intended primarily to obtain views emphasizing particular paths. Path focusing techniques are disclosed, for example, in U.S. Pat. No. 6,230,170, referenced above. Here, as in that patent, multiple foci are of interest to show several alternative versions of an authored paragraph or section. In various exemplary embodiments, the view controls distinguish between those used to selected focus cells, such as, for example, "add focus" and "delete foci", and those indicating the kind of display desired. Given a set of focus cells, a display, "W/focus" displays content only for cells on paths passing through those cells. For example, FIG. 22 shows a view of the treetable of FIG. 18 with two different focus cells and associated focus areas.

Other displays may distinguish focus paths only by highlighting ("W/O focus"), to assist in shifting foci. "Mini" displays, showing only initial fragments of cell content, are used for the same purpose for larger tables. These alternatives may be augmented by intermediate focus expansions showing full text for in-focus paths and indicative fragments for others. In various exemplary embodiments of the systems and methods according to this invention also may include an additional set of focus controls, borrowing from file browsers, oriented to subtree rather than path expansion, in order to reduce the space needed to represent areas of the treetable of lesser interest. Given a background default display type, individual subtrees may be given subtree-specific treatment, such as full display, fragmentary display, minimal display, or omission.

In various exemplary embodiments, the systems and methods according to this invention also encompass animation techniques useful in helping to maintain orientation during shifts in focus and in displaying layout changes due to editing operations.

Figure 23:
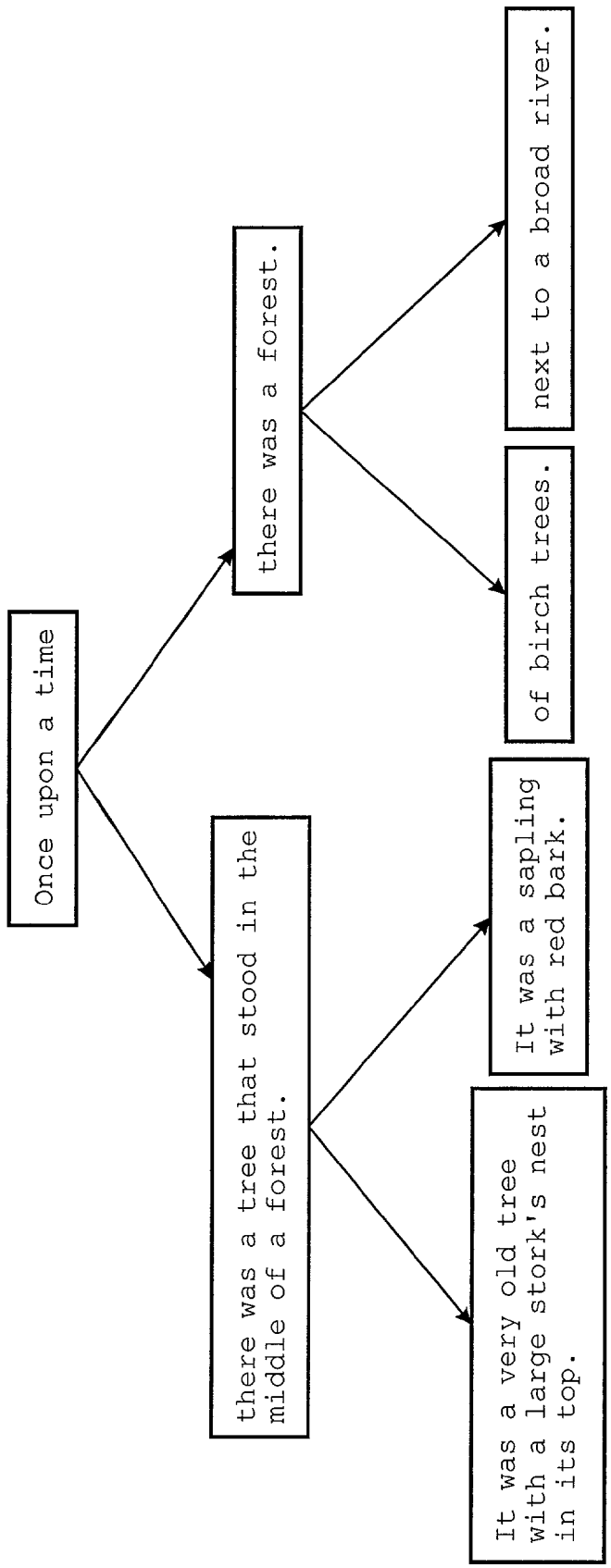
FIG. 23 displays a traditional node and link view of trees.

Content-driven treetables provide a particularly effective way to present text in a way that permits reading smoothly from one node to the next, across node boundaries. In fact, content-driven treetables are the most compact static way to lay out hierarchical text. Content-driven treetables draw on the common conventions of text layout in lines and vertical columns, such as in newspapers, and squeeze out the wasted space that a more traditional node and links view of tree-structure data consumes for the links in spacing, as shown in FIG. 23. In various exemplary embodiments of the systems and methods according to this invention, reading conventions for multiple language families can be accommodated. For example, Hebrew, which is read from right to left, can be placed in the treetable layouts already described. Languages sometimes printed vertically, such as Chinese, could be incorporated in a design that is rotated by 90° to grow toward the right or left as desired.

Structure-driven treetables, which can also be termed row-aligned treetables, have been described in U.S. patent application Ser. Nos. 09/954,388 and 09/954,530. They are intended for use when the structure of the hierarchy is of considerable interest and/or the combined node content is, in general, significantly larger than can be represented in a single window. Both of these conditions are present in the previously described e-mail thread embodiment, where the clear representation of structure is important both in indicating the relative sizes of particular sub-conversations, and in allowing the treetables to be used as convenient guides for extracting the full concatenated text of particular columns, or sets of successors, into another window, while maintaining context.

Content-driven treetables, which can also be termed free-form or unaligned treetables, are useful when visualizing variable-sized content and nesting takes precedence over direct visualization of the depth of items, which is what aligned rows present. Reading across the boundary of a node is enhanced because there is neither extra white space nor an abrupt clip of the content to fit, as would be the case if structure-driven treetables were used instead.

In various exemplary embodiments, the systems and methods according to this invention include several strategies for handling large trees. These strategies include (1) making a potentially arbitrarily-wide content-driven treetable in a window with a horizontal scrollbar. (2) Truncating or otherwise shortening the cell contents. A user might brush over the cell to see a full version, perhaps as a popup or a fluid annotation. (3) Allowing focusing on one or possibly more subtrees or cells, showing the surrounding cells in either truncated or purely structural form.

Figure 24:
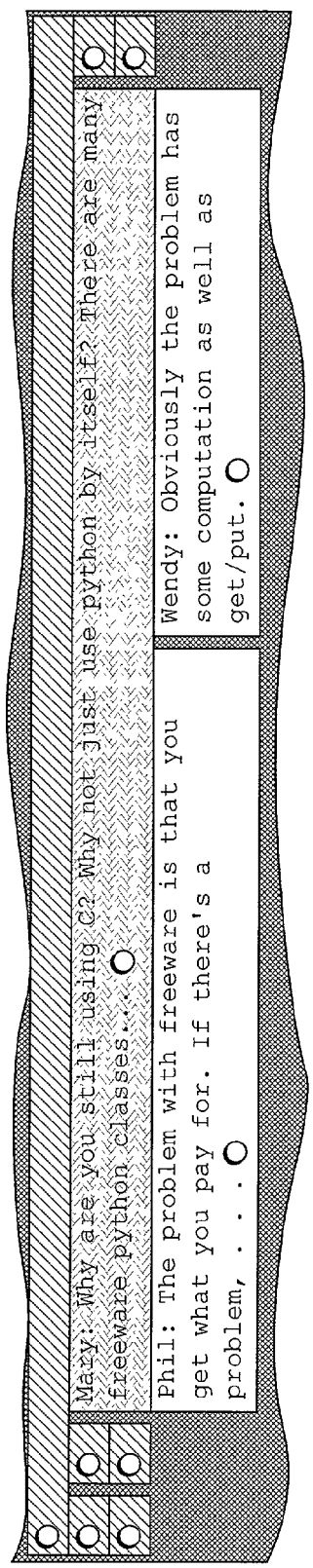
FIG. 24 is a visualization focusing on a single subtree.

In various exemplary embodiments, the systems and methods according to this invention include the creation of hybrid visualizations that combine two or more structure-driven treetables, or combined structure-driven treetables with content-driven treetables. One embodiment described above describes the use of structure-driven treetables to depict the structure and partial content of e-mail threads. The cells contain initial fragments of the messages involved, and serve as a base for deeper exploration, including in situ focus operations. These operations, which allow column or subtree focus, preserve the regularity of structure, and express focus in terms of sometimes radical differences in allocated column widths for in focus and out of focus areas. In various exemplary embodiments, the systems and methods according to this invention may extend the varieties of focused representations for structure-driven treetables to shrink areas not in focus both column-wise and row-wise, as illustrated in FIG. 24, which shows focus on a single subtree. In FIG. 24, both areas have a regular structure, but combining the two requires dispensing with regular rows. In certain circumstances, especially for relatively large tables, this visualization provides a better understanding of context than retaining uniform row heights.

Figure 25:
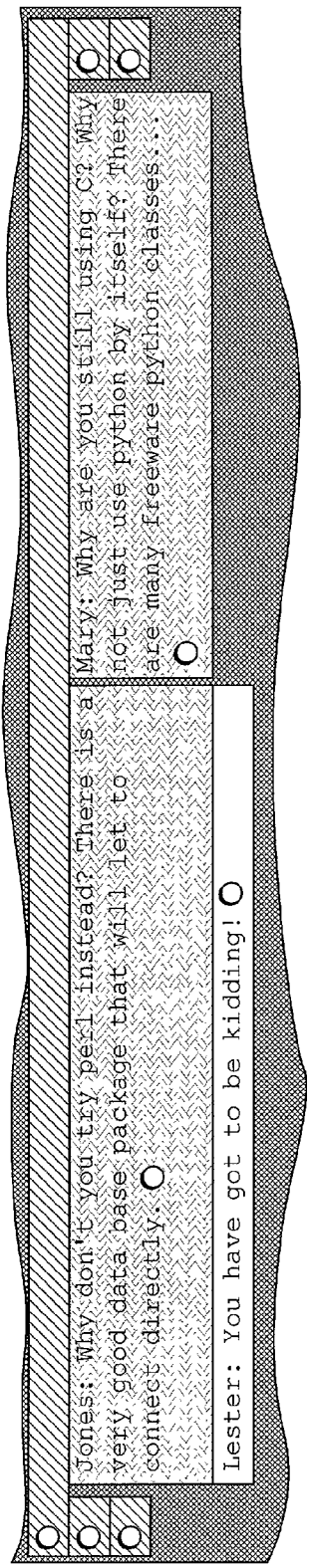
FIG. 25 illustrates two different subtrees.
Figure 26:
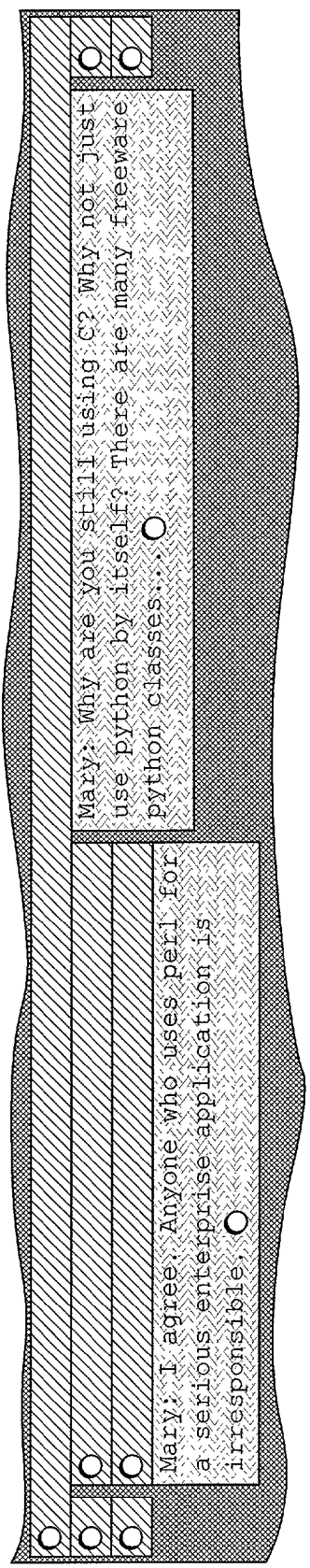
FIG. 26 shows a visualization which provides maximum space to all messages authored by a particular contributor.

In various exemplary embodiments of the systems and methods according to this invention, combining regular in focus and regular out of focus areas is useful to optionally allocate most of the space to the most recent messages of a thread. For example, FIG. 25 illustrates two different sub-trees that may contain messages subsequent to a given date. Moreover, dispensing with any regularity, one may provide maximal space to all the messages authored by a particular contributor, as illustrated in FIG. 26. It should be noted that in all these illustrations and visualizations, out of focus areas are minimized. However, less radical shrinking is also permissible.

Although most of the examples in this application show binary tree-structured data, that is, trees in which each parent has exactly two children, it should be appreciated that the algorithms and systems described herein are fully appropriate for tree-structured data with arbitrary and variable numbers of children.

Figure 27:
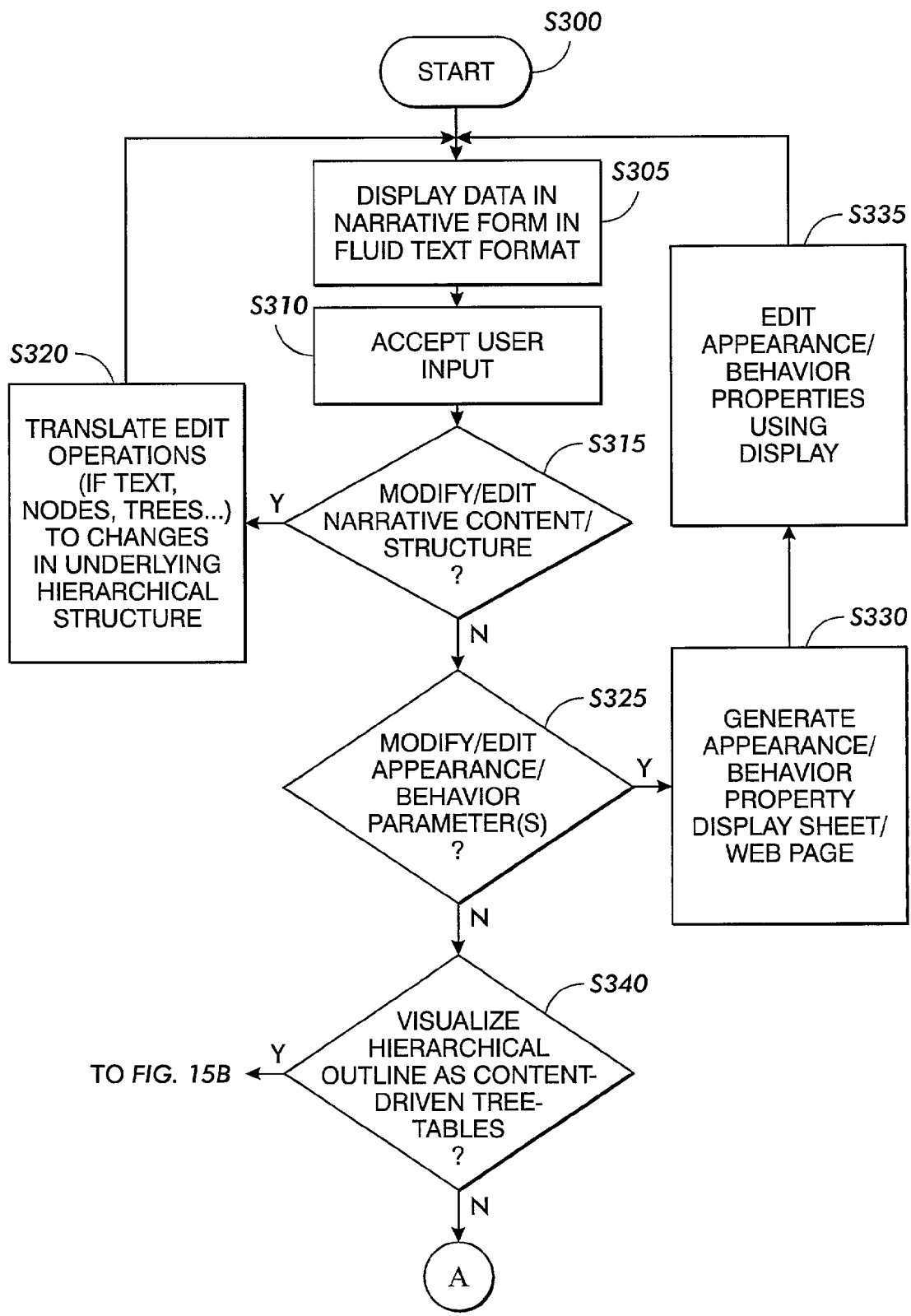
FIGS. 27 and 28 comprise a flowchart illustrating one exemplary embodiment of WYSIWYG editing involving content-driven treetables and a fluid text viewing system.
Figure 28:
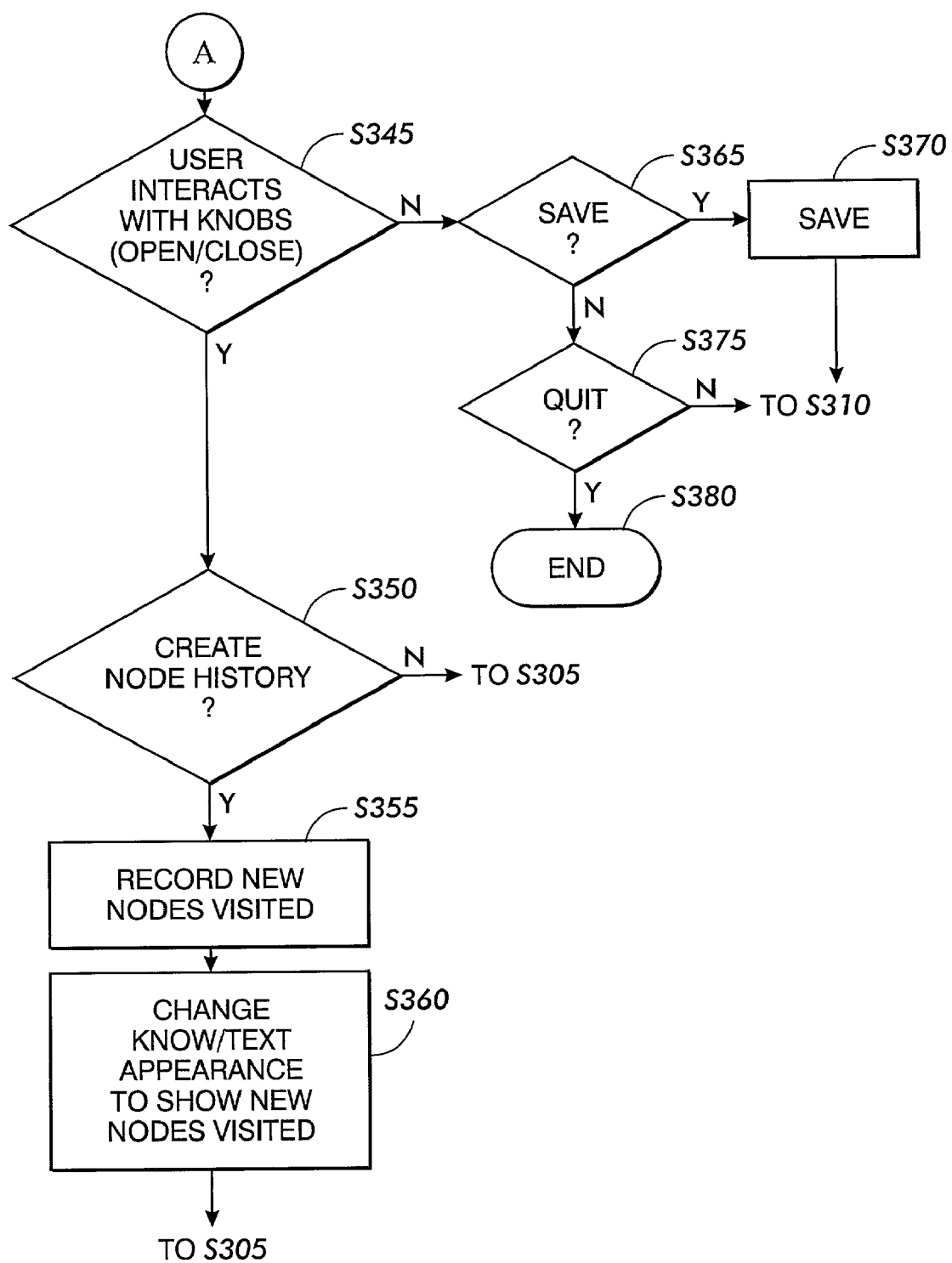

FIGS. 27 and 28 comprise an exemplary flowchart outlining an exemplary embodiment of a method of WYSIWYG fluid text editor editing fluid text narratives according to this invention. In step S300, the process starts. Then, in step S305, treetable data is displayed in fluid text narrative format. Next, in step S310, user input is accepted. Then, control proceeds to step S315 where a determination is made to whether the modification is with respect to data (e.g., text) content and/or data structure (e.g., node or tree edits), If yes, control proceeds to step S320, where the edit operations, e.g., of text, nodes or trees, are changed into modifications to the underlying hierarchical structure. Then control proceeds to step S305 to display the changed data in narrative form in fluid text format. If "no", control moves to step S325 to determine if a user wishes to edit narrative appearance or behavior characteristics. If so, control proceeds to step S330 to generate a narrative appearance/behavior characteristics property sheet and/or web page. Then control moves to step S335 to edit the appearance/behavior items listed on the property sheet and/or web page. Next, control forwards the edited appearance/behavior information to modify the display of the fluid text narrative. If not, control jumps to step S340 to determine if a user has selected visualizing the narrative in a content-driven treetable format. If so, control proceeds to perform the steps illustrated in FIG. 15B, and discussed, above, to create and display, and possibly edit, a content-driven treetable format of the narrative. If the decision in step S340 is no, control proceeds to step S345 where a determination is made whether a user wants to just interact with the fluid text knobs, i.e., opening and closing the knobs. If the decision in step S345 is "yes", control proceeds to step S350 to determine whether to create a node change/traversal history. If not, control returns to step 305 to display the changed knob/content appearance. If so, control continues to step S355 where the new nodes visited by a user are recorded. Then control proceeds to step S360 to change the appearance of any knobs and texts which were visited/traversed by a user. Control then returns to step 305 to display the changed knob/content appearance.

If the decision in step S345 is "no", control jumps to step S365 to determine whether a user has entered a save command. If so, control proceeds to step S370, where the fluid text content structures, appearance and/or history are saved, for example, to a file. Control then returns to step S310. If not, control jumps to step S375 to determine whether a user has entered a quit command. If not, control then returns to step S310. If so, control proceeds to step S380, where the process ends.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An authoring and editing tool for a hypertext fluid data narrative computer system, comprising:
   means for providing a visualization of a set of alternative sentences or sentence fragments expressed as a tree which has multiple paths therethrough; and
   means for simultaneously visualizing multiple paths through the tree in the form of a content-driven treetable having one or more cells, one of the one or more cells having a plurality of children, at least one of the plurality of children having a height and a width that are different from those of another of the plurality of children,
   wherein a first child of the plurality of children has a first content, a second child of the plurality of children has a second content that is larger in size than the first content by a content size different, the second child has a height and width that is larger than that of the first child to accommodate the content size difference.

2. The authoring and editing tool of claim 1, wherein a display for displaying all tree paths simultaneously, together with data associated with the paths.

3. The authoring and editing tool of claim 2, wherein the data associated with the paths is displayed in a tabular format.

4. The authoring and editing tool of claim 2, wherein the display has node cells and each displayed node cell spans cells representing its children in the tree.

5. The authoring and editing tool of claim 4, wherein the cells may have different heights to minimize wasted space on the display.

6. The authoring and editing tool of claim 5, further comprising a controller that provides a back dominator for multiple parent nodes.

7. The authoring and editing tool of claim 5, where the back dominator dominates only one merge node.

8. The authoring and editing tool of claim 2, wherein the display has columns and the columns have different widths to minimize wasted space on the display.

9. The authoring and editing tool of claim 2, wherein the display represents points of convergence of paths which merge in the display with a cell spanning several parent nodes.

10. The authoring and editing tool of claim 1, further comprising at least one editing controller.

11. The authoring and editing tool of claim 1, further including a controller to add and/or delete cells and subtrees.

12. The authoring and editing tool of claim 1, further including a controller to create and modify cell content.

13. The authoring and editing tool of claim 1, further including a controller to achieve reordering of cells and subtrees.

14. The authoring and editing tool of claim 1, further including a controller to insert merge cells and merge dominator cells.

15. The authoring and editing tool of claim 1, further comprising at least one view controller.

16. The authoring and editing tool of claim 1, further including a controller that provides a plurality of different data reading conventions for fluid data.

17. The authoring and editing tool of claim 1, wherein the visualization is in WYSIWYG format.

18. The authoring and editing tool of claim 1, wherein the hypertext fluid data narrative comprises a taxonomy.

19. A method of visualizing fluid data on a computer, the fluid data expressed as a tree using content-driven treetables, comprising:
   providing the fluid data expressed as a tree using content-driven treetables,
   representing the fluid data as a content-driven treetable, the content-driven treetable having one or more cells, one of the one or more cells having a plurality of children, at least one of the plurality of children having a height and a width that are different from those of another of the plurality of children;
   collecting a request from a user to modify the treetable; and
   modifying the fluid data based on the user request, wherein a first child of the plurality of children has a first content, a second child of the plurality of children has a second content that is larger in size than the first content by a content size difference, the second child has a height and width that is larger than that of the first child to accommodate the content size difference.

20. An authoring and editing tool for a hypertext fluid data narrative computer system, comprising:
   means for providing a visualization of a set of alternative sentences or sentence fragments expressed as a tree which has multiple paths therethrough;
   means for simultaneously visualizing multiple paths through the tree in the form of a content-driven treetable having one or more cells; and
   a set of view controllers which include means for identifying sets of focus cells, including colunm focus cells, which are all cells within an identified plurality of columns, and sub-tree focus cells, which are all cells representing an identified plurality of subtrees, and with cells not in a set of in-focus cells being out-of-focus cells.

21. An authoring and editing tool for a hypertext fluid data narrative computer system. comprising:
   means for providing a visualization of a set of alternative sentences or sentence fragments expressed as a tree which has multiple paths therethrouah: and
   means for simultaneously visualizing multiple paths through the tree in the form of a content-driven treetable having one or more cells, one of the one or more cells that is different from that of another of the plurality of children; that is different from that of another of the plurality of children:
   wherein the display displays all tree paths simultaneously, together with data associated with the paths:
   the display has node cells and each displayed node cell spans cells representing its children in the tree:
   the cells have different heights to minimize wasted space on the display: and
   different cell dimensions and different amounts of cell-included content are provided for in-focus and out-of-focus cells to emphasize in-focus cells.

22. A tool useable on a computer for tree-structured data, comprising:
   means for providing a visualization of a set of text sentences or sentence fragments expressed as a tree which has multiple paths therethrough; and
   means for simultaneously visualizing multiple paths through the tree as a content-driven treetable, the content-driven treetable having one or more cells, one of the one or more cells having a plurality of children, at least one of the plurality of children having a height or width that is different from that of another of the plurality of children, wherein a first child of the plurality of children has a first content, a second child of the plurality of children has a second content that is larger in size than the first content by a content size different, the second child has a height and width that is larger than. that of the first child to accommodate the content size difference.

23. An authoring and editing tool for a hypertext taxonomy computer system, comprising:
   means for authoring class and subclass definitions of the taxonomy, which form a tree; and
   means for visualizing the class and subclass definitions in a content-driven treetable, the content-driven treetable having one or more cells, one of the one or more cells having a plurality of children, at least one of the plurality of children having a height or width that is different from that of another of the plurality children,
   wherein a first child of the plurality of children has a first content, a second child of the plurality of children has a second content that is larger in size than the first content by a content size different, the second child has a height and width that is larger than that of the first child to accommodate the content size difference.

24. A fluid text reader containing fluid text, comprising:
   visualization system interaction controls including content, structure, appearance and behavior controls for fluid text, the visualization system interaction controls using content-driven treetables, the content-driven treetable having one or more cells, one of the one or more cells having a plurality of children, at least one of the plurality of children having a height and width that is different form that of another of the plurality of children,
   wherein a first of the plurality of children has a first content,a second child of the plurality of children has a second content that is larger in size than the first content by a content size different, the second child has a height and width that is larger than that of the first child to accommodate size difference.

* * * * *